(12) United States Patent
Kim et al.

(10) Patent No.: US 12,087,906 B2
(45) Date of Patent: *Sep. 10, 2024

(54) SOLID CONDUCTOR, PREPARATION METHOD THEREOF, SOLID ELECTROLYTE INCLUDING THE SOLID CONDUCTOR, AND ELECTROCHEMICAL DEVICE INCLUDING THE SOLID CONDUCTOR

(71) Applicants: Samsung Electronics Co., Ltd., Suwon-si (KR); The Florida State University Research Foundation, Inc., Tallahassee, FL (US)

(72) Inventors: Ryounghee Kim, Uiwang-si (KR); Jeongju Cho, Burlington, MA (US); Lincoln Miara, Burlington, MA (US); Sawankumar Patel, Tallahassee, FL (US); Yan Wang, Burlington, MA (US); Yan-Yan Hu, Tallahassee, FL (US); Hyeokjo Gwon, Hwaseong-si (KR); Sewon Kim, Suwon-si (KR); Jusik Kim, Hwaseong-si (KR); Sungkyun Jung, Suwon-si (KR)

(73) Assignees: SAMSUNG ELECTRONICS CO., LTD., Gyeonggi-Do (KR); THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,585

(22) Filed: Jun. 22, 2023

(65) Prior Publication Data

US 2023/0361340 A1 Nov. 9, 2023

Related U.S. Application Data

(63) Continuation of application No. 16/881,629, filed on May 22, 2020, now Pat. No. 11,728,510.
(Continued)

(30) Foreign Application Priority Data

May 21, 2020 (KR) .................. 10-2020-0060768

(51) Int. Cl.
*H01M 10/0562* (2010.01)
*C01B 25/45* (2006.01)
(Continued)

(52) U.S. Cl.
CPC ......... *H01M 10/0562* (2013.01); *C01B 25/45* (2013.01); *C01B 25/455* (2013.01);
(Continued)

(58) Field of Classification Search
CPC ....... C01B 25/45; C01B 25/455; C01G 35/00; C01G 35/006; C01G 35/02;
(Continued)

(56) References Cited

U.S. PATENT DOCUMENTS

| 4,009,092 A | 2/1977 | Taylor |
| 6,402,795 B1 | 6/2002 | Chu et al. |

(Continued)

FOREIGN PATENT DOCUMENTS

| CN | 103474656 A | 12/2013 |
| CN | 105811006 A | 7/2016 |

(Continued)

OTHER PUBLICATIONS

Kim et al., "LiTa2PO8: A Fast Lithium-Ion Conductor with New Framework Structure", Journal of Materials Chemistry A, vol. 6, Oct. 29, 2018, pp. 22478-22482.*
(Continued)

*Primary Examiner* — Brittany L Raymond
(74) *Attorney, Agent, or Firm* — CANTOR COLBURN LLP

(57) ABSTRACT

A solid conductor including:
a compound represented by Formula 1, a compound represented by Formula 2,
or a combination thereof $$Li_{1+x+y-z}Ta_{2-x}M_xP_{1-y}Q_yO_{8-z}X_z \quad \text{Formula 1}$$

wherein, in Formula 1,
M is an element having an oxidation number of +4,
Q is an element having an oxidation number of +4,
X is a halogen, a pseudohalogen, or a combination thereof, and
$0 \le x \le 2$, $0 \le y < 1$, and $0 \le z \le 2$, except that cases i) x and y and z are simultaneously 0, ii) M is Hf, X is F, x is
(Continued)

1, y is 0, and z is 1, iii) M is Hf, X is Cl, x is 2, y is 0, and z is 2, and iv) M is Hf, X is F, x is 2, y is 0, and z is 2, $$Li_{1+x+y-z}Ta_{2-x}M_xP_{1-y}Q_yO_8 \cdot zLiX \qquad \text{Formula 2}$$

wherein, in Formula 2,
M is an element having an oxidation number of +4,
Q is an element having an oxidation number of +4,
X is a halogen, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

19 Claims, 24 Drawing Sheets

Related U.S. Application Data

(60) Provisional application No. 62/852,552, filed on May 24, 2019.

(51) Int. Cl.
*C01B 25/455* (2006.01)
*C01B 33/32* (2006.01)
*H01M 10/0525* (2010.01)

(52) U.S. Cl.
CPC ......... *C01B 33/32* (2013.01); *H01M 10/0525* (2013.01); *C01P 2002/52* (2013.01); *C01P 2002/72* (2013.01); *C01P 2002/86* (2013.01); *C01P 2002/88* (2013.01); *C01P 2006/40* (2013.01); *H01M 2300/0074* (2013.01); *H01M 2300/008* (2013.01)

(58) Field of Classification Search
CPC . H01M 2300/0071; H01M 2300/0074; H01M 2300/008; H01M 10/0562
See application file for complete search history.

(56) References Cited

U.S. PATENT DOCUMENTS

| | | | |
|---|---|---|---|
| 6,485,622 | B1 | 11/2002 | Fu |
| 7,514,181 | B2 | 4/2009 | Ugaji et al. |
| 7,901,658 | B2 | 3/2011 | Weppner |
| 8,828,580 | B2 | 9/2014 | Visco et al. |
| 9,490,500 | B2 | 11/2016 | Shin et al. |
| 10,128,533 | B2 | 11/2018 | Yamamoto et al. |
| 2016/0020458 | A1 | 1/2016 | Choi et al. |
| 2016/0181657 | A1 | 6/2016 | Kawaji et al. |
| 2016/0211498 | A1 | 7/2016 | Kim et al. |
| 2018/0006326 | A1 | 1/2018 | O'Neill et al. |
| 2018/0006328 | A1 | 1/2018 | O'Neill et al. |
| 2018/0159172 | A1 | 6/2018 | O'Neill et al. |
| 2018/0248201 | A1 | 8/2018 | Shimoda et al. |
| 2019/0067695 | A1 | 2/2019 | Ito et al. |
| 2019/0207252 | A1 | 7/2019 | Badding et al. |
| 2020/0075994 | A1 | 3/2020 | Sasaki et al. |
| 2020/0373613 | A1 | 11/2020 | Kim et al. |
| 2021/0202988 | A1 | 7/2021 | Kim et al. |
| 2021/0408576 | A1 | 12/2021 | Kim et al. |
| 2023/0353848 | A1 | 11/2023 | Lee et al. |

FOREIGN PATENT DOCUMENTS

| | | |
|---|---|---|
| CN | 108511794 A | 9/2018 |
| CN | 109888374 A | 6/2019 |
| EP | 3621130 A | 3/2020 |
| EP | 3932860 A1 | 1/2022 |
| JP | 2005108638 A | 4/2005 |
| JP | 2015216220 A | 12/2015 |
| JP | 6321443 B2 | 5/2018 |
| KR | 20160010297 A | 1/2016 |
| KR | 1020160113842 A | 10/2016 |
| KR | 101909727 B1 | 10/2018 |
| KR | 101940240 B1 | 1/2019 |
| KR | 102101271 B1 | 4/2020 |
| TW | 201711249 A | 3/2017 |
| WO | 2012147837 A1 | 11/2012 |
| WO | 2018181823 A1 | 10/2018 |
| WO | 2020036290 A1 | 2/2020 |

OTHER PUBLICATIONS

M. V. Sukhanov et al., "Synthesis and Structure of New Framework Phosphates Li1/4M7/4(PO4)3 (M=Nb, Ta)", Crystallography Reports, vol. 6, No. 6, 2008, pp. 974-980.*

Fiaz Hussain et al., "Theoretical Insights into Li-ion Transport in LiTa2PO8," The Journal of Physical Chemistry C, Jul. 23, 2019, pp. 19282-19287, vol. 123.

Jaegyeom Kim et al., "LiTa2PO8: A Fast Lithium-ion Conductor with New Framework Structure," Electronic Supplementary Material (ESI) for Journal of Materials Chemistry A, 2018, pp. S1-S11.

Jaegyeom Kim, "Synthesis, crystal structures, and ionic transport properties of three-dimensional framework oxides, ATa2PO8 (A=H, Li, and Na)," Graduate School of Ajou University, Department of Energy Systems Research Applied Chemistry, Feb. 2019, pp. 1-127.

Jaegyeom Kim et al., "LiTa2PO8: a fast lithium-ion conductor with new framework structure," Journal of Materials Chemistry A, Oct. 29, 2018, pp. 22478-22482, vol. 6, DOI: 10.1039/c8ta09170f.

Zhongliang Xiao et al., "LiTa2PO8 coated nickel-rich cathode material for improved electrochemical performance at high voltage," Ceramics International, 2020, pp. 8328-8333, vol. 46.

Jürgen Janek et al., "A solid future for battery development," Nature Energy, Sep. 2016, pp. 1-4, vol. 1, DOI: 10.1038/Nenergy.2016.141.

Lincoln J. Miara et al., "First-Principles Studies on Cation Dopants and Electrolyte|Cathode Interphases for Lithium Garnets," Chemistry of Materials, Apr. 30, 2015, vol. 27, pp. 4040-4047.

M. V. Sukhanov et al., "Synthesis and Structure of New Framework Phosphates Li 1/4 M 7/4 (PO4)3(M=Nb, Ta)," Crystallography Reports, 2008, pp. 974-980, vol. 53, No. 6, DOI: 10.1134/S1063774508060102.

Mohammed Isah Kimpa et al., "Physical characterization and electrical conductivity of Li1.2Ti1.8Al0.2(PO4)3 and Li1.2Ta0.9Al1.1(PO4)3 NASICON material," International Journal of Integrated Engineering: Special Issue 2018, Dec. 31, 2018, pp. 108-112, vol. 10, No. 9.

Norikazu Ishigakia et al. "Structural and Li-ion diffusion properties of lithium tantalum phosphate LiTa2PO8," Solid State Ionics, 2020, pp. 1-6, vol. 351, No. 115314.

Zhang, Z., et al. "New horizons for inorganic solid state ion conductors," Energy & Environmental Science, vol. 11, pp. 1945-1976, Jun. 11, 2018.

Chinese Office Action for Chinese Patent Application No. 202010442550.4 dated Dec. 21, 2023.

Japanese Office Action for Japanese Patent Application No. 2020-090451 dated May 20, 2024.

* cited by examiner

SOLID CONDUCTOR, PREPARATION METHOD THEREOF, SOLID ELECTROLYTE INCLUDING THE SOLID CONDUCTOR, AND ELECTROCHEMICAL DEVICE INCLUDING THE SOLID CONDUCTOR

CROSS-REFERENCE TO RELATED APPLICATION

This application is a continuation of U.S. application Ser. No. 16/881,629, filed on May 22, 2020, which claims priority to and the benefit of U.S. Provisional Patent Application No. 62/852,552, filed on May 24, 2019, in the United States Patent and Trademark Office, and Korean Patent Application No. 10-2020-0060768, filed on May 21, 2020, in the Korean Intellectual Property Office, and all the benefits accruing therefrom under 35 U.S.C. § 119, the contents of which is incorporated herein in its entirety by reference.

BACKGROUND

1. Field

The present disclosure relates to a solid conductor, methods of preparing the same, a solid electrolyte including the solid conductor, and an electrochemical device including the solid conductor.

2. Description of Related Art

Lithium secondary batteries have large electrochemical capacity, high operation potential, and excellent charge/discharge characteristics. In this regard, demand for lithium secondary batteries is increasing for applications such as a portable electronic device or a small power storage device for home use, such as a motorcycle, an electric automobile, a hybrid electric automobile, or the like. In accordance with the increased use of lithium secondary batteries in such applications, there has been a demand for improved safety and performance of lithium secondary batteries.

A lithium secondary battery uses a liquid electrolyte, which causes stability problems because the lithium secondary battery easily ignites when exposed to water in the air. These stability problems become apparent when lithium secondary batteries are used in electric automobiles. Accordingly, studies on an all-solid-state secondary battery, which use a solid electrolyte consisting of inorganic material to improve stability, have been actively carried out in recent years. An all-solid-state secondary battery is attractive as a next-generation secondary battery in terms of stability, having high energy density, having high output, having long lifespan, having a simplified manufacturing process, enlargement and compactification of a battery, and having low cost.

An all-solid-state secondary battery includes a cathode, a solid electrolyte, and an anode, wherein the solid electrolyte provides high ionic conductivity and low electron conductivity. The solid electrolyte in the all-solid-state secondary battery includes a sulfide-based solid electrolyte, an oxide-based solid electrolyte, or a combination thereof. The oxide-based solid electrolyte does not generate a toxic substance in the manufacturing process as compared to the sulfide-based electrolyte, and has excellent stability. However, the oxide-based solid electrolyte has low ionic conductivity at room temperature as compared with the sulfide-based solid electrolyte. Accordingly, there is a need to develop a solid conductor exhibiting high ionic conductivity at room temperature and having improved stability.

SUMMARY

Provided is a solid conductor having improved ionic conductivity and improved lithium stability, and methods of manufacturing the solid conductor.

Provided is a solid electrolyte including the solid conductor.

Provided is an electrochemical device including the solid conductor.

Additional aspects will be set forth in part in the description which follows and, in part, will be apparent from the description.

According to an aspect, a solid conductor includes: a compound represented by Formula 1, a compound represented by Formula 2, or a combination thereof

$$Li_{1+x+y-z}Ta_{2-x}M_xP_{1-y}Q_yO_{8-z}X_z \qquad \text{Formula 1}$$

wherein, in Formula 1,
M is an element having an oxidation number of +4,
Q is an element having an oxidation number of +4,
X is a halogen atom, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2,

$$Li_{1+x+y-z}Ta_{2-x}M_xP_{1-y}Q_yO_8 \cdot zLiX \qquad \text{Formula 2}$$

wherein, in Formula 2,
M is an element having an oxidation number of +4,
Q is an element having an oxidation number of +4,
X is a halogen atom, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

According to an aspect, a method of manufacturing the solid conductor includes:
preparing a precursor mixture comprising a precursor for forming a solid conductor; and
heat-treating the precursor mixture in an oxidizing gas to manufacture a solid conductor represented by Formula 1, Formula 2, or a combination thereof,

$$Li_{1+x+y-z}Ta_{2-x}M_xP_{1-y}Q_yO_{8-z}X_z \qquad \text{Formula 1}$$

wherein, in Formula 1,
M is an element having an oxidation number of +4,
Q is an element having an oxidation number of +4,
X is a halogen, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2,

$$Li_{1+x+y-z}Ta_{2-x}M_xP_{1-y}Q_yO_8 \cdot zLiX \qquad \text{Formula 2}$$

wherein, in Formula 2,
M is an element having an oxidation number of +4,
Q is an element having an oxidation number of +4,
X is a halogen atom or a pseudohalogen, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

The heat-treating may include heat-treating at about 500° C. to about 1,200° C.

The heat-treating may include a first heat-treatment, and a second heat-treatment, wherein the second heat-treatment is performed at a temperature greater than a temperature of the first heat-treatment.

The first heat-treatment may include heat-treating at a temperature in a range of about 500° C. to about 1,000° C., and the second heat-treatment may include heat-treating at a temperature in a range of about 600° C. to about 1,200° C.

According to an aspect, a solid electrolyte includes: the solid conductor in the form of a layer on at least one of a cathode or an anode.

According to an aspect, an electrochemical device includes: a cathode, an anode, and the solid conductor between the cathode and the anode.

The electrochemical device may include a cathode, an anode, and a solid electrolyte disposed between the cathode and the anode, which includes the solid conductor.

BRIEF DESCRIPTION OF THE DRAWINGS

The above and other aspects, features, and advantages will be more apparent from the following description taken in conjunction with the accompanying drawings, in which.

DETAILED DESCRIPTION

Figure 1A:
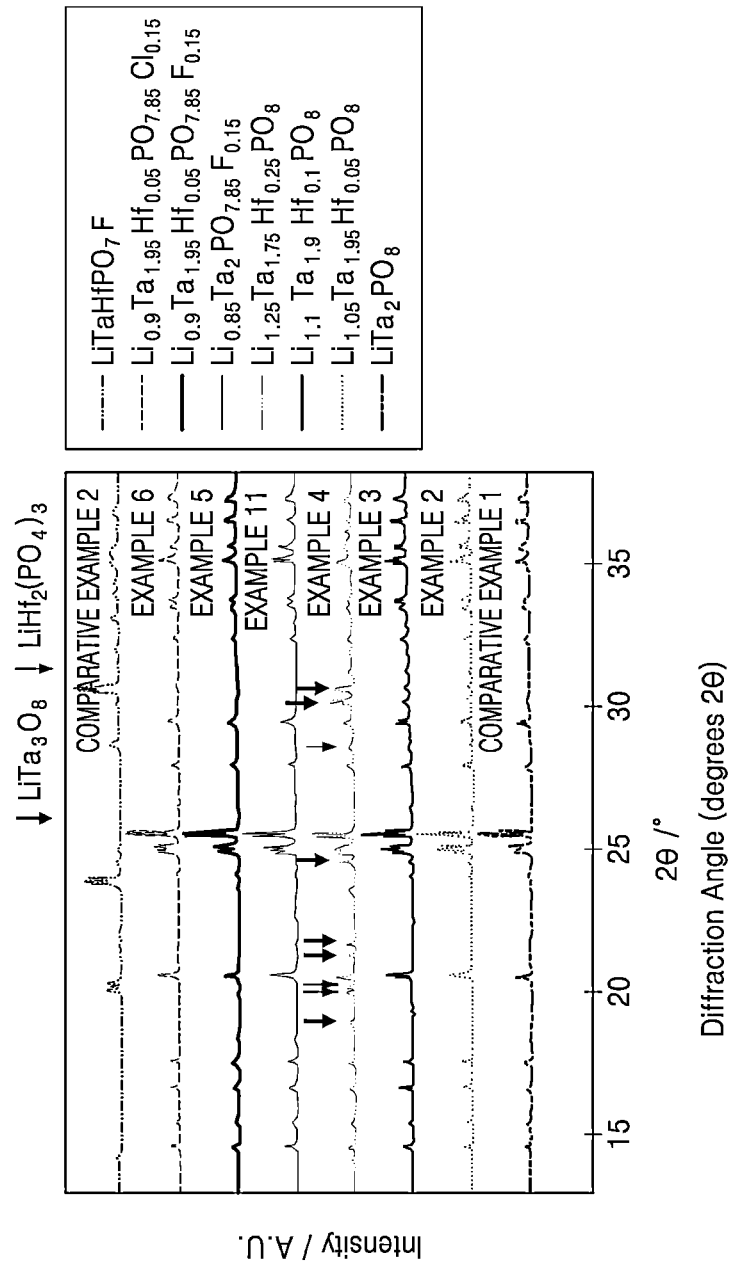
FIG. 1A is a graph of intensity in arbitrary units (a.u.) versus diffraction angle (°2θ) of a solid conductor according to Examples 2 to 6, 11 and Comparative Examples 1 and 2, when analyzed by X-ray diffraction (XRD) analysis using Cu Kα radiation.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid conductor according to an embodiment, a method of manufacturing the same, a solid electrolyte including the solid conductor, and an electrochemical device including the solid conductor will be described in further detail.

According to an aspect of an embodiment, a solid conductor comprises: a compound represented by Formula 1, a compound represented by Formula 2, or a combination thereof $$Li_{1+x+y-z}Ta_{2-x}M_xP_{1-y}Q_yO_{8-z}X_z$$ Formula 1

In Formula 1,
M is an element having an oxidation number of +4,
Q is an element having an oxidation number of +4,
X is a halogen atom, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2, $$Li_{1+x+y-z}Ta_{2-x}M_xP_{1-y}Q_yO_8 \cdot zLiX$$ Formula 2 in Formula 2,
M is an element having an oxidation number of +4,
Q is an element having an oxidation number of +4,
X is a halogen atom, a pseudohalogen, or a combination thereof, and
$0 \leq x \leq 2$, $0 \leq y < 1$, and $0 \leq z \leq 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

In an aspect, the disclosed compound is a compound of Formula 1, with the proviso that x, y, and z cannot all be 0 at the same time.

The case of $LiHfTaPO_7F$, $LiHf_2PO_6Cl_2$, and $LiHf_2PO_6F_2$ in the compound of Formula 1 is excluded.

In Formulae 1 and 2, x and z in Formula 1 and x and z in Formula 2 are each independently $0 \leq x < 0.6$ and $0 \leq z < 1$.

In Formulae 1 and 2, M is an element having an oxidation number of +4, and may substitute for tantalum in a crystal structure of the compound, and may have a coordination number of 6. M in Formulas 1 and 2 is independently selected.

In Formulae 1 and 2, Q may have a coordination number of 4. Q in Formulas 1 and 2 is independently selected.

In the compound of Formula 1, X may be substituted for a portion of the oxygen. Also, the compound of Formula 2 may be in the form of a composite in which LiX (for example, LiCl or LiF) and $Li_{1+x+y}Ta_{2-x}M_xP_{1-y}Q_yO_8$ are present, e.g., a product of adding LiX as an additive to $Li_{1+x+y}Ta_{2-x}M_xP_{1-y}Q_yO_8$. X in Formulas 1 and 2 is independently selected.

The expression "a compound represented by Formula 1, a compound represented by Formula 2, or a combination thereof" as used herein refers to a compound represented by Formula 1 only, a compound represented by Formula 2 only, a mixture of a compound represented by Formula 1 and a compound represented by Formula 2, or a composite of a compound represented by Formula 1 and a compound represented by Formula 2.

The term "pseudohalogen" as used herein refers to a molecule consisting of two or more electronegative atoms resembling halogens in a free state and generates anions similar to halide ions. Examples of the pseudohalogen include cyanide (CN), cyanate (OCN), thiocyanate (SCN), azide ($N_3$), or a combination thereof.

In Formulae 1 and 2, M may be, for example, hafnium (Hf), zirconium (Zr), titanium (Ti), germanium (Ge), tin (Sn), iridium (Ir), rhodium (Rh), manganese (Mn), osmium (Os), ruthenium (Ru), platinum (Pt), or a combination thereof. M in Formulas 1 and 2 is independently selected.

In Formulae 1 and 2, x in Formula 1 and x in Formula 2 may each independently be, for example, greater than 0 and equal to or less than 0.5, for example, greater than 0 and less than 0.5. For example, x in Formulae 1 and 2 may each independently be equal to 0.025 or more and less than 0.1, for example, in a range of 0.05 to 0.1.

In Formula 1, Q is an element having an oxidation number of +4. In a structure of the compound of Formula 1, Q may substitute for phosphorus (P). Examples of Q include silicon (Si), Sn, Ti, Ge, selenium (Se), palladium (Pd), Rh, cobalt (Co), molybdenum (Mo), chromium (Cr), Ru, nickel (Ni), Mn, vanadium (V), or a combination thereof. Si, Sn, Ti, Ge, and niobium (Nb) may each have an oxidation number of +5, and Se may have an oxidation number of +6. In Formula 1, y may be 0, or greater than 0 and equal to or less than 0.5, for example, in a range of 0.1 to 0.5, and for example, in a range of 0.1 to 0.2. Q in Formulas 1 and 2 is independently selected.

In Formulae 1 and 2, X may partially substitute for oxygen in a crystal structure of the compound of Formula 1 and the compound of Formula 2. Examples of X include chlorine (Cl), bromine (Br), fluorine (F), CN, OCN, SCN, azide ($N_3$), or a combination thereof. In Formulae 1 and 2, z in Formula 1 and z in Formula 2 may each independently be 0, or greater than 0 and equal to or less than 0.9, for example, in a range of about 0.01 to about 0.5, and for example, in a range of about 0.01 to about 0.25, and for example, about 0.05 to about 0.15.

The term "oxidation number" as used herein refers to an average oxidation number.

A lithium phosphate-based lithium ion conductor may be $LiTa_2PO_8$.

However, such a lithium phosphate-based lithium ion conductor does not reach satisfactory levels of ionic conductivity at room temperature or have acceptable lithium stability, and thus there is a need for a compound with improved ionic conductivity and improved lithium stability.

Accordingly, a solid conductor with improved ionic conductivity at room temperature (e.g., 25° C.) and improved lithium stability was found by introducing an element M with an oxidation number of +4 to an octahedral site of tantalum (Ta) in $LiTa_2PO_8$, introducing an element (Q) with an oxidation number of +4 to a tetrahedral site of P in $LiTa_2PO_8$, or introducing the element M with an oxidation number of +4 to an octahedral site of tantalum (Ta) in $LiTa_2PO_8$ and the element (Q) having an oxidation number of +4 in a tetrahedral site of P in $LiTa_2PO_8$ at the same time.

The solid conductor may be a lithium ion conductor.

In addition, a halogen atom, such as C and F, or a pseudohalogen may be introduced to the position of oxygen in a crystal structure of the solid conductor. While not wanting to be bound by theory, it is understood that when a halogen atom or a pseudohalogen is introduced in the solid conductor and used in the manufacture of a solid electrolyte, a passivation layer containing the halogen or pseudohalogen may be formed between a lithium metal electrode and a solid electrolyte including the solid conductor, thereby improving lithium stability of the solid electrolyte. In addition, due to the presence of LiF or LiCl in a grain boundary of the solid electrolyte, lithium ionic conductivity may be increased at the grain boundary.

The solid conductor according to an embodiment may be a lithium ion conductor, for example, a $LiTa_2PO_8$-based lithium ion conductor, and may have a monoclinic or monoclinic-like structure, and may have a C2/c space group. The solid conductor according to an embodiment may also have a structure in which two [$MO_6$] octahedrons and one [$PO_4$] tetrahedron are corner sharing.

The solid conductor according to an embodiment may have improved bulk ionic conductivity and total ionic conductivity characteristics, as compared with $LiTa_2PO_8$.

The solid conductor may be electrically neutral. A $Li^+$ vacancy may be introduced to match the electrical neutrality of the solid conductor. The vacancy becomes a site where $Li^+$ can hop, by a hopping mechanism, thereby reducing an activation energy level for Li migration.

The compound represented by Formula 1 may be a compound represented by Formula 3 or 4:

$$Li_{1+x+y-z}Ta_{2-x}Hf_xP_{1-y}Si_yO_{8-z}X_z \quad \text{Formula 3}$$

wherein, in Formula 3,
  X is a halogen atom or a pseudohalogen,
  $0 \le x \le 2$, $0 \le y < 1$, and $0 \le z \le 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2;

$$Li_{1+x+y-z}Ta_{2-x}Zr_xP_{1-y}Si_yO_{8-z}X_z \quad \text{Formula 4}$$

wherein, in Formula 4,
  X is a halogen atom or a pseudohalogen, and
  $0 \le x \le 2$, $0 \le y < 1$, and $0 \le z \le 2$, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

In Formulae 3 and 4, X in Formula 3 and X in formula 4 may each be independently selected.

In Formulae 3 and 4, x and z in Formula 3 and x and z in Formula 4 are independently $0 \le x < 0.6$, and $0 \le z < 1$.

In Formulae 3 and 4, x may be, for example, greater than 0 and equal to or less than 0.5, for example, equal to or greater than 0.1 to less than 0.5, for example, in a range of about 0.1 to about 0.2.

In Formulae 3 and 4, each y may independently be 0, or greater than 0 or equal to and less than 0.5, for example, in a range of about 0.1 to about 0.5, and for example, in a range of about 0.1 to about 0.2. In Formulae 3 and 4, each z may independently be greater than 0 and equal to or less than 0.9, for example, in a range of about 0.01 to about 0.8, for example, in a range of about 0.01 to about 0.7, for example, in a range of about 0.01 to about 0.6, for example, in a range of about 0.01 to about 0.5, for example, in a range of about 0.01 to about 0.2, and for example, in a range of about 0.05 to about 0.15. In Formulae 3 and 4, Hf or Zr may partially substitute for the position of Ta in a crystal structure of the compound of Formula 3 or in a crystal structure of the compound of Formula 4. In addition, when Si with an oxidation number of +4 is introduced instead of P with an oxidation number of +5 to the [$PO_4$] tetrahedron, $Li^+$ may be introduced in excess to provide the electrical neutrality of the solid conductor, and accordingly, an amount of mobile $Li^+$ is also increased, thereby increasing the lithium ionic conductivity.

When an anion X partially substitutes for the oxygen, a passive layer, for example, including F, may be formed, and accordingly, due to the presence of LiF or LiCl in a grain boundary, the lithium ionic conductivity may be increased at the grain boundary.

The compound represented by Formula 2 may be a compound represented by Formula 5 or 6:

$$Li_{1+x+y-z}Ta_{2-x}Hf_xP_{1-y}Si_yO_8 \cdot zLiX \quad \text{Formula 5}$$

wherein, in Formula 5,
X is a halogen atom, and
0≤x≤2, 0≤y<1, and 0≤z≤2, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2;

$$Li_{1+x+y-z}Ta_{2-x}Zr_xP_{1-y}Si_yO_8 \cdot zLiX \quad \text{Formula 2}$$

wherein, in Formula 6,
X is a halogen atom, and
0≤x≤2, 0≤y<1, and 0≤z≤2, except that cases i) x and y and z are simultaneously 0, ii) M is Hf, X is F, x is 1, y is 0, and z is 1, iii) M is Hf, X is Cl, x is 2, y is 0, and z is 2, and iv) M is Hf, X is F, x is 2, y is 0, and z is 2.

In Formulae 5 and 6, X in Formula 5 and X in Formula 6 is each independently selected.

In Formulae 5 and 6, x and z in Formula 5 and x and z in Formula 6 are each independently 0≤x<0.6, and 0≤z<1.

In Formulae 5 and 6, each x may be, for example, independently, greater than 0 and equal to or less than 0.5, for example, equal to or greater than 0.1 to less than 0.5, for example, in a range of about 0.1 to about 0.2.

In Formulae 5 and 6, each y may independently be 0, or greater than 0 and equal to and less than 0.5, for example, greater than 0 and less than 0.5, for example, in a range of 0.1 to about 0.5, and for example, in a range of about 0.1 to about 0.2. In Formulae 5 and 6, each z may independently be greater than 0 and equal to or less than 0.9, for example, in a range of about 0.01 to about 0.8, for example, in a range of about 0.01 to about 0.7, for example, in a range of about 0.01 to about 0.6, for example, in a range of about 0.01 to about 0.5, for example, in a range of about 0.01 to about 0.2, and for example, in a range of about 0.05 to about 0.15.

In Formulae 5 and 6, each z may independently be 0, or greater than 0 and equal to or less than 0.9, for example, in a range of 0.01 to 0.8, for example, in a range of 0.01 to 0.7, for example, in a range of 0.01 to 0.6, for example, in a range of 0.01 to 0.5, for example, 0.01 to 0.2, and for example, in a range of 0.05 to 0.15.

The solid conductor may be a compound represented by Formula 5, a compound represented by Formula 6, or a combination thereof.

Examples of the solid conductor include $Li_{0.9}Ta_2PO_{7.9}F_{0.1}$, $Li_{0.9}Ta_2PO_{7.9}Cl_{0.15}$, $Li_{0.85}Ta_2PO_{7.85}Cl_{0.15}$, $Li_{0.85}Ta_2PO_{7.85}F_{0.15}$, $Li_{0.8}Ta_2PO_{7.8151}F_{0.2}$, $Li_{0.8}Ta_2PO_{7.8}Cl_{0.2}$, $Li_{1.025}Hf_{0.025}Ta_{1.975}PO_8$, $Li_{1.05}Hf_{0.05}Ta_{1.95}PO_8$, $Li_{1.1}Hf_{0.1}Ta_{1.9}PO_8$, $Li_{1.25}Hf_{0.25}Ta_{1.75}PO_8$, $Li_{1.125}Hf_{0.125}Ta_{1.875}PO_8$, $Li_{1.375}Hf_{0.375}Ta_{1.625}PO_8$, $Li_{1.125}Zr_{0.125}Ta_{1.875}PO_8$, $Li_{1.25}Zr_{0.25}Ta_{1.75}PO_8$, $Li_{1.375}Zr_{0.375}Ta_{1.625}PO_8$, $Li_{1.025}Zr_{0.025}Ta_{1.975}PO_8$, $Li_{1.05}Zr_{0.05}Ta_{1.95}PO_8$, $Li_{1.1}Zr_{0.1}Ta_{1.9}PO_8$, $Li_{0.9}Hf_{0.05}Ta_{1.95}PO_{7.85}F_{0.15}$, $Li_{0.9}Hf_{0.05}Ta_{1.95}PO_{7.85}Cl_{0.15}$, $Li_{0.8}Hf_{0.05}Ta_{1.95}PO_{7.75}F_{0.25}$, $Li_{0.8}Hf_{0.05}Ta_{1.95}PO_{7.75}Cl_{0.25}$, $Li_{0.875}Hf_{0.025}Ta_{1.975}PO_{7.85}F_{0.15}$, $Li_{0.875}Hf_{0.025}Ta_{1.975}PO_{7.85}Cl_{0.15}$, $Li_{0.775}Hf_{0.025}Ta_{1.975}PO_{7.75}F_{0.25}$, $Li_{0.775}Hf_{0.025}Ta_{1.975}PO_{7.75}Cl_{0.25}$, $Li_{0.95}Hf_{0.1}Ta_{1.9}PO_{7.85}Cl_{0.15}$, $Li_{0.85}Hf_{0.1}Ta_{1.9}PO_{7.75}F_{0.25}$, $Li_{0.85}Hf_{0.1}Ta_{1.9}PO_{7.75}Cl_{0.25}$, $Li_{1.1}Hf_{0.25}Ta_{1.75}PO_{7.85}Cl_{0.15}$, $Li_1Hf_{0.25}Ta_{1.75}PO_{7.75}F_{0.25}$, $Li_1Hf_{0.25}Ta_{1.75}PO_{7.75}Cl_{0.25}$, $Li_{0.975}Hf_{0.125}Ta_{1.875}PO_{7.85}Cl_{0.15}$, $Li_{0.875}Hf_{0.125}Ta_{1.875}PO_{7.75}F_{0.25}$, $Li_{0.875}Hf_{0.125}Ta_{1.875}PO_{7.75}Cl_{0.25}$, $Li_{1.225}Hf_{0.375}Ta_{1.625}PO_{7.85}Cl_{0.15}$, $Li_{1.125}Hf_{0.375}Ta_{1.625}PO_{7.75}F_{0.25}$, $Li_{1.125}Hf_{0.375}Ta_{1.625}PO_{7.75}Cl_{0.25}$, $Li_{0.975}Zr_{0.125}Ta_{1.875}PO_{7.85}Cl_{0.15}$, $Li_{0.875}Zr_{0.125}Ta_{1.875}PO_{7.75}F_{0.25}$, $Li_{0.875}Zr_{0.125}Ta_{1.875}PO_{7.75}Cl_{0.25}$, $Li_{1.1}Zr_{0.25}Ta_{1.75}PO_{7.85}Cl_{0.15}$, $Li_1Zr_{0.25}Ta_{1.75}PO_{7.75}F_{0.25}$, $Li_1Zr_{0.25}Ta_{1.75}PO_{7.75}Cl_{0.25}$, $Li_{1.225}Zr_{0.375}Ta_{1.625}PO_{7.85}Cl_{0.15}$, $Li_{1.125}Zr_{0.375}Ta_{1.625}PO_{7.75}F_{0.25}$, $Li_{1.125}Zr_{0.375}Ta_{1.625}PO_{7.75}Cl_{0.25}$, $Li_{0.875}Zr_{0.025}Ta_{1.975}PO_{7.85}Cl_{0.15}$, $Li_{0.775}Zr_{0.025}Ta_{1.975}PO_{7.75}F_{0.25}$, $Li_{0.775}Zr_{0.025}Ta_{1.975}PO_{7.75}Cl_{0.25}$, $Li_{1.05}Zr_{0.05}Ta_{1.95}PO_8$, $Li_{1.05}Zr_{0.05}Ta_{1.95}PO_{7.85}Cl_{0.15}$, $Li_{1.05}Zr_{0.05}Ta_{1.95}PO_{7.75}F_{0.25}$, $Li_{1.05}Zr_{0.05}Ta_{1.95}PO_{7.75}Cl_{0.25}$, $Li_{1.1}Zr_{0.1}Ta_{1.9}PO_8$, $Li_{1.1}Zr_{0.1}Ta_{1.9}PO_{7.85}Cl_{0.15}$, $Li_{1.1}Zr_{0.1}Ta_{1.9}PO_{7.75}F_{0.25}$, $Li_{1.1}Zr_{0.1}Ta_{1.9}PO_{7.75}Cl_{0.25}$; $Li_{0.975}Ta_2PO_{7.975}F_{0.025}$, $Li_{0.95}Ta_2PO_{7.95}Cl_{0.05}$, $Li_{0.975}Ta_2PO_{7.975}Cl_{0.025}$, $Li_{0.95}Ta_2PO_{7.95}ClF_{0.05}$, $Li_{1.05}Ta_{1.975}Hf_{0.025}P_{0.975}Si_{0.025}O_8$, $Li_{1.2}Ta_{1.9}Hf_{0.1}P_{0.9}Si_{0.1}O_8$, $Li_{1.5}Hf_{0.5}Ta_{1.5}PO_8$, $Li_{0.875}Ta_2PO_{7.875}F_{0.125}$, $Li_{0.75}Ta_2PO_{7.75}F_{0.25}$, $Li_{0.625}Ta_2PO_{7.625}F_{0.375}$, $Li_{0.5}Ta_2PO_{7.5}F_{0.5}$, $Li_{0.375}Ta_2PO_{7.375}F_{0.625}$, $Li_{0.25}Ta_2PO_{7.25}F_{0.75}$, or a combination thereof.

The solid conductor may improve isotropic ionic conductivity.

In a lithium ion conductor, the ion conduction occurs very rapidly in the z-axis direction compared to the x-axis and y-axis directions (c(z-axis)>>b(y-axis) and a(x-axis)).

However, in the solid conductor, according to an embodiment, the ion conduction path and the ion conductivity, which are fast only in a crystallographic c (e.g., z-axis) direction in a general lithium ion conductor, are relaxed to the level c(z-axis)>b(y-axis)>a(x-axis) in terms of anisotropy. That is, the anisotropy may be reduced or relaxed, thereby improving the isotropy of the ionic conductivity.

The term "isotropy of ionic conductivity" as used herein refers that the diffusion path of lithium ions decreases in the order of the c(z-axis) direction, the b(y-axis) direction, and the a(x-axis) direction so that, due to a reduced difference of the diffusion path among the directions, the anisotropy of the ionic conductivity is reduced. That is, the isotropy of ionic conductivity is improved.

Improvement in the isotropy of ionic conductivity in the solid conductor is supported by the results of the nudged elastic band (NEB) calculation of the diffusivity (D)(unit: $cm^2/s$) by diffusion of Li ions and the mean-square displacements (MSDs), before and after the introduction of a dopant to the solid conductor. The solid conductor shows a decrease in the anisotropy of the diffusion path (i.e., an increase in lithium mobility in the a-axis and the b-axis), resulting in an increase in the ionic conductivity. In this regard, it is confirmed that the solid conductor exhibits isotropic ionic conductivity characteristics.

The solid conductor may have a monoclinic or monoclinic-like structure, and may have a C2/c space group. When analyzed by X-ray diffraction using CuKα radiation, butt on both sides the solid conductor has a peak at about 17.5°2θ±0.5°2θ, about 24.8°±0.5°2θ, about 24.9°2θ±0.5°2θ, about 25.4°2θ±0.5°2θ, and about 27.8°2θ±0.5°2θ, and for example, about 17.5°2θ±0.2°2θ, about 24.8°2θ±0.2°2θ, about 24.9°2θ±0.2°2θ, about 25.4°2θ±0.2°2θ, or about 27.8°2θ±0.2°2θ. For example, when analyzed by X-ray diffraction using CuK radiation, the solid conductor has a peak at about 17.5teθ, about 24.8ndθ, about 24.9ndθ, about 25.4ndθ, and about 27.8 toθ, when analyzed by X-ray diffraction using Cu Kα when anal.

A solid conductor including LiX, such as LiCl in Formula 2, may exhibit characteristics of X-ray diffraction peaks shifted with respect to X-ray diffraction peaks of an oxide not including LiX, such as LiCl (wherein z=0 in Formula 1).

Based on the X-ray diffraction peak characteristics shifting in this manner, it may be confirmed that the X of LiX partially substitutes on the position of the oxygen.

It is also confirmed by referring to a $^{31}$P-nuclear magnetic resonance (NMR) spectrum that an element having an oxidation number of +4, such as Hf, is introduced into the crystal structure of the solid conductor.

In the $^{31}$P-NMR spectrum of the solid conductor of Formula 1 according to an embodiment, a primary peak has a chemical shift in a range of about −6 parts per million (ppm) to about −14 ppm, and has a full width at half-maximum (FWHM) in a range of about 2 ppm to about 6 ppm or in a range of about 2 ppm to about 3 ppm. The primary peak at about −6 parts per million (ppm) to about −14 ppm may have a greatest intensity of peaks in the 31P-NMR spectrum, and the FWHM indicates a numerical value of a peak width at a ½ position of the maximum peak intensity of the peak.

In the $^{31}$P-NMR spectrum of the solid conductor, a secondary peak has chemical shift in a range of about −15 ppm to about −22 ppm.

Here, the secondary peak refers to a peak having an intensity which is less than an intensity of the primary peak.

The solid conductor according to an embodiment may have ionic conductivity of about $1 \times 10^{-2}$ mS/cm or more at room temperature (25° C.), for example, about $1.8 \times 10^{-1}$ mS/cm or more, for example, about $2.8 \times 10^{-1}$ mS/cm or more, for example, about $5.4 \times 10^{-1}$ mS/cm or more, and for example, about $6.6 \times 10^{-1}$ mS/cm or more. The ionic conductivity may be, for example, about $1 \times 10^{-2}$ mS/cm to about 10 mS/cm, or about $5 \times 10^{-2}$ mS/cm to about 1 mS/cm, or about $1 \times 10^{-1}$ mS/cm to about $8 \times 10^{-1}$ mS/cm. When the solid conductor has such high ionic conductivity at room temperature, the internal resistance of an electrochemical battery including the solid conductor may be further reduced.

The solid conductor may have electronic conductivity of $1 \times 10^{-5}$ mS/cm or less, for example, $1 \times 10^{-6}$ mS/cm or less. The electronic conductivity may be, for example, about $1 \times 10^{-9}$ mS/cm to about $1 \times 10^{-5}$ mS/cm, or about $1 \times 10^{-8}$ mS/cm to about $1 \times 10^{-6}$ mS/cm.

Since the solid conductor according to an embodiment has high ionic conductivity at room temperature and low electronic conductivity as described above, the solid conductor is very useful as a solid electrolyte.

When the solid conductor according to an embodiment is used as an electrode additive, the electronic conductivity may be $1 \times 10^{-5}$ mS/cm greater than the electronic conductivity of the solid conductor when the solid conductor is used as a solid electrolyte. The electrode may be a high-voltage cathode. As such, a battery having high power density using the solid conductor as an electrode additive may be manufactured.

The solid conductor may be, for example, electrochemically stable at 2.0 Volt (V) to 4.6 V with respect to lithium metal.

The solid conductor may have an activation energy level of less than 0.42 electron-volt per atom (eV/atom), for example, less than 0.37 eV/atom, for example, in a range of about 0.29 eV/atom to about 0.35 eV/atom.

The solid conductor may have a grain size in a range of about 5 nanometers (nm) to about 500 micrometers (μm), for example, about 5 nm to about 100 μm, about 5 nm to about 10 μm, or about 5 nm to about 1 μm. When the solid conductor includes X in Formula 1, the grain size may be reduced, and accordingly, the stability between grains and grains may be improved, thereby improving the adhesion between the grains.

The solid conductor according to an embodiment may be in a particulate state. The solid conductor may have an average diameter of a particle in a range of about 5 nm to about 500 μm, for example, about 100 nm to about 100 μm, about 1 μm to about 50 μm, and may have a specific surface area in a range of about 0.01 square meters per gram (m²/g) to about 1,000 m²/g, for example, in a range of about 0.5 m²/g to about 100 m²/g.

A method of manufacturing the solid conductor according to an embodiment is described as follows.

First, a precursor for forming the solid conductor according to an embodiment is mixed to provide a precursor mixture, and then, a heat-treatment is performed on the precursor mixture in an oxidizing gas atmosphere to obtain a solid conductor. The solid conductor may include a compound represented by Formula 1, a compound represented by Formula 2, or a combination thereof:

$$Li_{1+x+y-z}Ta_{2-x}M_xP_{1-y}Q_yO_{8-z}X_z \quad \text{Formula 1}$$

wherein, in Formula 1,

M is an element having an oxidation number of +4,

Q is an element having an oxidation number of +4,

X is a halogen atom, a pseudohalogen, or a combination thereof, and

0≤x≤2, 0≤y<1, and 0≤z≤2, with the proviso that at least one of x, y, and z is not 0, $$Li_{1+x+y-z}Ta_{2-x}M_xP_{1-y}Q_yO_8 \cdot zLiX \quad \text{Formula 2}$$

wherein, in Formula 2,

M is an element having an oxidation number of +4,

Q is an element having an oxidation number of +4,

X is a halogen atom a pseudohalogen, or a combination thereof, and

0≤x≤2, 0≤y<1, and 0≤z≤2, with the proviso that at least one of x, y, and z is not 0.

When x and y in Formulae 1 and 2 are each 0 at the same time, the precursor for forming the solid conductor may be a mixture of a Li precursor, a Ta precursor, a P precursor, and an X-containing Li precursor.

When x and y in Formulae 1 and 2 are not 0 at the same time, the precursor for forming the solid conductor may be a mixture of a Li precursor, a Ta precursor, an M precursor, a Q precursor, a P precursor, and/or an X-containing Li precursor.

When x, in Formulae 1 and 2, is 0, an M precursor is not used as the precursor for forming the solid conductor. When y, in Formulae 1 and 2, is 0, an Q precursor is not used as the precursor for forming the solid conductor. When z, in Formulae 1 and 2, is 0, an X-containing Li precursor is not used as the precursor for forming the solid conductor.

The precursor mixture may further include a solvent. The solvent may be any substance capable of dissolving or dispersing the Li precursor, the Ta precursor, the M precursor, the Q precursor, the P precursor, and X-containing Li precursor. The solvent may be, for example, acetone, ethanol, water, ethylene glycol, isopropanol, or a combination thereof. An amount of the solvent may be in a range of about 50 parts by weight to about 1,000 parts by weight, for example, about 100 parts by weight to about 300 parts by weight, based on 100 parts by weight of the total weight of a precursor compound.

The mixing may be performed according to methods known in the art, such as milling, blending, stirring, or other suitable mixing method. The milling may include, for example, ball mill, air-jet mill, bead mill, roll mill, planetary mill, or other suitable milling method.

A heating rate at the time of the heat-treatment on the precursor mixture may be in a range of about 1 degree Celsius per minute (° C./min) to about 10° C./min, and the heat-treatment temperature (T1) may be in a range of about 500° C. to about 1,200° C., for example, about 600° C. to about 1,000° C. When the heating rate during the heat-treatment is within the range above, the heat-treatment may be sufficiently performed.

The heat-treatment may be performed in an oxidizing gas atmosphere. The oxidizing gas atmosphere may be prepared by using, for example, air or oxygen. In addition, the heat-treatment time varies depending on the temperature of the first heat treatment. For example, the heat-treatment may be performed for about 1 hour to about 20 hours, for example, about 1 hour to about 10 hours, and for example, about 2 hours to about 8 hours.

The heat-treatment may be performed in a two-step process including a first heat-treatment and a second heat-treatment, where the second heat-treatment is performed at a temperature higher than a temperature at which the first heat-treatment is performed. The first heat-treatment may be performed at a temperature in a range of about 500° C. to about 1,000° C. or about 600° C. to about 1,000° C., and the second heat-treatment may be performed at a temperature in a range of about 600° C. to about 1,200° C. or at a temperature of 1,100° C. When the heat-treatment is performed in this two-step process, a high-density solid conductor is obtained.

Following the first heat-treatment, the heat-treated product may be milled before the second heat-treatment. Here, the milling may include, for example, a planetary milling or hand milling. This milling may be performed to control a particle size of the heat-treated product. The particle size of the heat-treated product obtained by the milling may be controlled to, about 1 μm or less, for example, about 500 nm or less, about 300 nm or less, or about 100 nm or less. The particle size is in a range from about 1 nm to about 1 μm, from about 1 nm to about 500 nm, from about 1 nm to about 300 nm, or from about 1 nm to about 100 nm. By controlling the particle size in this manner, a solid conductor having an improved density may be finally obtained.

The term "particle size" as used herein refers to an average particle diameter when the particle is spherical, or to a long axis length when the particle is non-spherical.

The Li precursor may include, for example, lithium oxide, lithium carbonate, lithium chloride, lithium sulfide, lithium nitrate, lithium phosphate, lithium hydroxide, or a combination thereof.

The Ta precursor may include, for example, tantalum hydroxide, tantalum carbonate, tantalum chloride, tantalum sulfate, tantalum nitrate, tantalum oxide, or a combination thereof.

The P precursor may include, for example, $(NH_4)_2HPO_4$, $(NH_4)H_2PO_4$, $Na_2HPO_4$, $Na_3PO_4$, or a combination thereof.

The M precursor may include, for example, an M-containing oxide, an M-containing carbonate, an M-containing chloride, an M-containing phosphate, an M-containing hydroxide, an M-containing nitrate, or a combination thereof, and for example, hafnium oxide, hafnium chloride, hafnium sulfate, zirconium oxide, zirconium chloride, zirconium sulfate, or a combination thereof.

The Q precursor may include, for example, a Q-containing oxide, a Q-containing carbonate, a Q-containing chloride, a Q-containing phosphate, a Q-containing hydroxide, a Q-containing nitrate, or a combination thereof, and for example, silicon oxide, tin oxide, tin chloride, or a combination thereof.

The X-containing precursor may be LiCl, LiF, LiBr, or a combination thereof.

An amount of each of the precursors described above may be stoichiometrically controlled, so as to obtain the solid conductor including the compound represented by Formula 1, the compound represented by Formula 2, or a combination thereof.

Next, the heat-treated product may be pulverized to obtain a formed product. The formed product may be, for example, a powder particle. A size of the formed product (e.g., powder particle) obtained by pulverization may be 10 μm or less. When the size of the pulverized particle is 10 μm or less, the particle size is so small that the pulverization and mixing may be sufficiently performed. The term "size" as used herein refers to an average particle diameter when the particle is spherical, and to a long axis length when the particle is non-spherical. The size may be measured by using a scanning electron microscope or a particle size analyzer.

Then, the formed product may be subjected to heat-treatment. Here, a heating rate during the heat-treatment may be in a range of about 1° C./min to about 10° C./min. The heat-treatment may be performed at a temperature in a range of about 600° C. to about 1,100° C., 600° C. to about 1,000° C., or about 1,000° C. to about 1,100° C. The heat-treatment temperature (T2) for the formed product may be higher than the heat-treatment temperature (T1) which is measured before the formed product is obtained.

The formed product may be pressed into a pellet form before the heat-treatment is performed on the formed product. When the formed product is heat-treated in the form of a pellet, the diffusion distance of a substance to be heat-treated is shortened, and in this regard, a desired solid conductor may be easily manufactured.

The heat-treatment of the formed product may be performed, for example, in an oxidizing gas atmosphere, a reducing gas atmosphere, or an inert gas atmosphere. The oxidizing gas atmosphere may be formed using, for example, air or oxygen. The reducing gas atmosphere may be formed using a reducing gas such as hydrogen and an inert gas atmosphere such as nitrogen, argon, or helium.

The heat-treatment time for the formed product depends on the heat-treatment temperature (T2) for the formed product, and may be, for example, in a range of 1 hour to 50 hours, or for example, 6 hours to 48 hours.

An electrochemical device may include the solid conductor. The electrochemical device may include, for example, an electrochemical battery, a storage battery, a supercapacitor, a fuel battery, a sensor, or a color-changing device.

According to an embodiment, there is provided an electrochemical battery including: a cathode, an anode, and a solid electrolyte disposed between the cathode and the anode and including the solid conductor. The electrochemical battery may include: a cathode; an anode including Li; and a solid electrolyte disposed between the cathode and the anode and including the solid conductor according to an embodiment.

The electrochemical battery may include a lithium secondary battery, a lithium air battery, or a solid battery. In addition, the electrochemical battery may be used for both a primary battery and a secondary battery. A shape of the electrochemical battery is not particularly limited, and may be, for example, a coin type, a button type, a sheet type, a laminate type, a cylindrical type, a flat type, a horn type, or other suitable shape. The electrochemical battery according to an embodiment may be applicable to a middle- or large-sized battery for an electric automobile.

The electrochemical battery may be, for example, an all-solid-state battery using a deposition-type anode. The deposition-type anode refers to an anode having an anode-free coating layer including no anode active material at the time of assembling the electrochemical battery, in which an anode material, such as lithium metal, is deposited after charging the electrochemical battery.

The solid electrolyte may include an electrolyte protective film, a cathode protective film, an anode protective film, or a combination thereof.

The solid electrolyte according to an embodiment may be used as a cathode protective film in a battery using a sulfide-based solid electrolyte, so as to effectively reduce a reaction between the sulfide-based solid electrolyte and the cathode. The solid electrolyte according to an embodiment may be also used as a material for coating the cathode, and accordingly, may be used as a cathode protective film. The solid electrolyte according to an embodiment may have a high oxidation stability potential of about 3.5 V or more vs. Li/Li$^+$, for example, in a range of about 4.6 V to about 5.0 V vs. Li/Li+. In this regard, the solid electrolyte may be used as a cathode electrolyte. For example, the solid electrolyte may be used as a catholyte of an all-solid-state battery.

In an embodiment, the electrochemical battery may be an all-solid-state battery.

Figure 9:
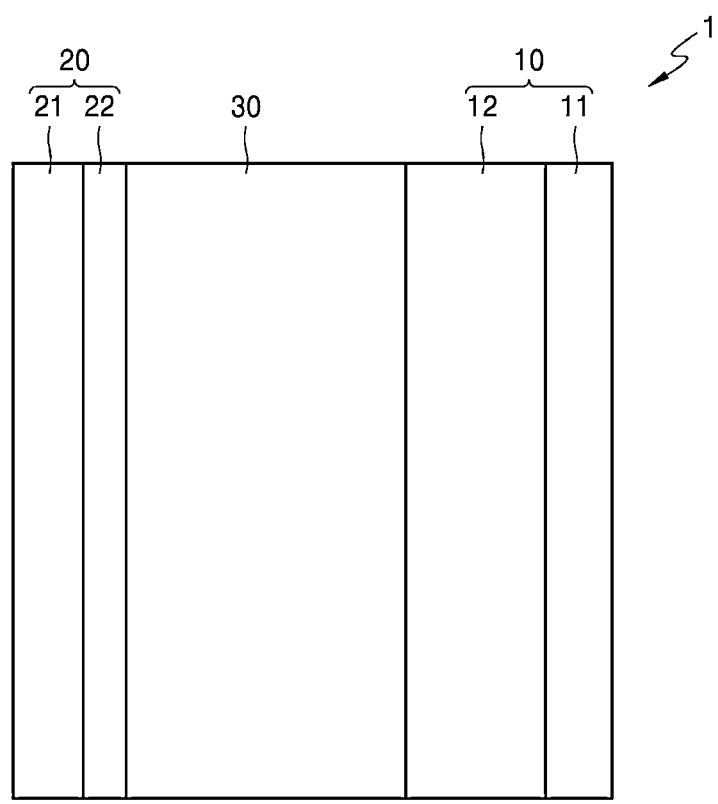
FIGS. 9 to 11 are each a cross-sectional view showing a schematic configuration of an embodiment of an all-solid-state battery.

FIG. 9 shows a configuration of an all-solid-state secondary battery 1 according to an embodiment. As shown in FIG. 9, the all-solid-state secondary battery 1 includes a cathode 10, an anode 20, and a solid electrolyte 30 including the solid conductor according to an embodiment.

The cathode 10 may include a cathode current collector 11 and a cathode active material layer 12. For use as the current collector 11, a plate or a foil, each consisting of, for example, In, copper (Cu), magnesium (Mg), stainless steel, Ti, iron (Fe), Co, Ni, zinc (Zn), aluminum (Al), Ge, Li, or an alloy thereof. The current collector 11 may be omitted.

The cathode active material layer 12 may include a cathode active material and a solid electrolyte. In addition, the solid electrolyte included in the cathode 10 may be similar to or different from the solid electrolyte 30.

Any cathode active material capable of reversibly intercalating and deintercalating lithium ions may be used.

For example, the cathode active material may be lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, iron oxide, or vanadium oxide. Such a cathode active material may be used alone or in combination.

In addition, the cathode active material may be, for example, a lithium transition metal oxide, such as LiNi$_x$Co$_y$Al$_z$O$_2$ (NCA) (wherein 0<x<1, 0<y<1, 0<z<1, and x+y+z=1) or LiNi$_x$Co$_y$Mn$_z$O$_2$ (NCM) (wherein 0<x<1, 0<y<1, 0<z<1, and x+y+z=1).

The cathode active material may be covered with a coating layer. Any suitable material may be used for forming a coating layer of a cathode active material of an all-solid-state secondary battery. An example of the coating layer includes a lithium ion conducting material, such as Li$_2$O—ZrO$_2$.

In addition, the cathode active material may be nickel containing compound such as NCA or NCM, of a ternary transition metal oxide. When Ni is used in the cathode active material, the capacity density of the all-solid-state secondary battery 1 may be increased. Therefore, the all-solid-state secondary battery 1 may improve the long-term reliability and the cycle characteristics in the charged state.

A shape of the cathode active material may be, for example, a particle shape such as a sphere or an ellipse. In addition, a particle diameter of the cathode active material is not particularly limited, and may be in any suitable range that is applied to the cathode active material of a solid secondary battery. In addition, an amount of the cathode active material of the cathode 10 is not particularly limited, and may be in any suitable range of that is applied to the cathode of a solid secondary battery.

In addition, the cathode 10 may include, in addition to the cathode active material and the solid electrolyte described above, an additive, such as a conductive agent, a binder, a filler, a dispersant, an ion conductive auxiliary agent, or the like.

Examples of the conductive agent that can be mixed into the cathode 10 include graphite, carbon black, acetylene black, Ketjen black, carbon fiber, metal powder, or a combination thereof. In addition, examples of the binder that can be mixed into the cathode 10 include styrene butadiene rubber (SBR), polytetrafluoroethylene, polyvinylidenefluoride, polyethylene, or a combination thereof. In addition, any suitable material may be used as the filler, the dispersant, or the ion conductive auxiliary agent that can be mixed into the cathode 10.

The anode 20 may include an anode current collector 21 and an anode-free coating layer 22. The anode-free coating layer 22 is illustrated in FIG. 9, but may be a general anode active material layer.

The anode-free coating layer 22 may have, for example, a structure having a metal, such as silicon, and carbon, and a conductive binder arranged around the metal and the carbon.

The anode-free coating layer 22 may have a thickness in a range of about 1 μm to about 20 μm. The anode current collector 21 may be made of a material that does not react with lithium, i.e., a material that does not form an alloy with lithium or a compound with lithium. Examples of a material constituting the anode current collector 21 include Cu, stainless steel, Ti, Fe, Co, and Ni. The anode current collector 21 may be one type of metal, an alloy of two or more kinds of metals, or a coating material. The anode current collector 21 may be, for example, in the form of a plate or a thin film.

Figure 10:
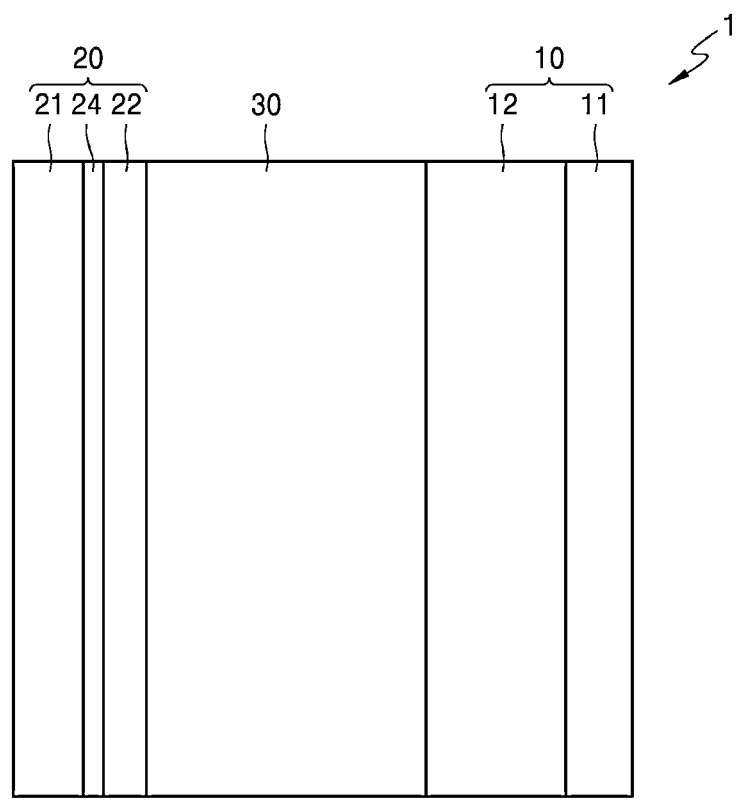
Figure 11:
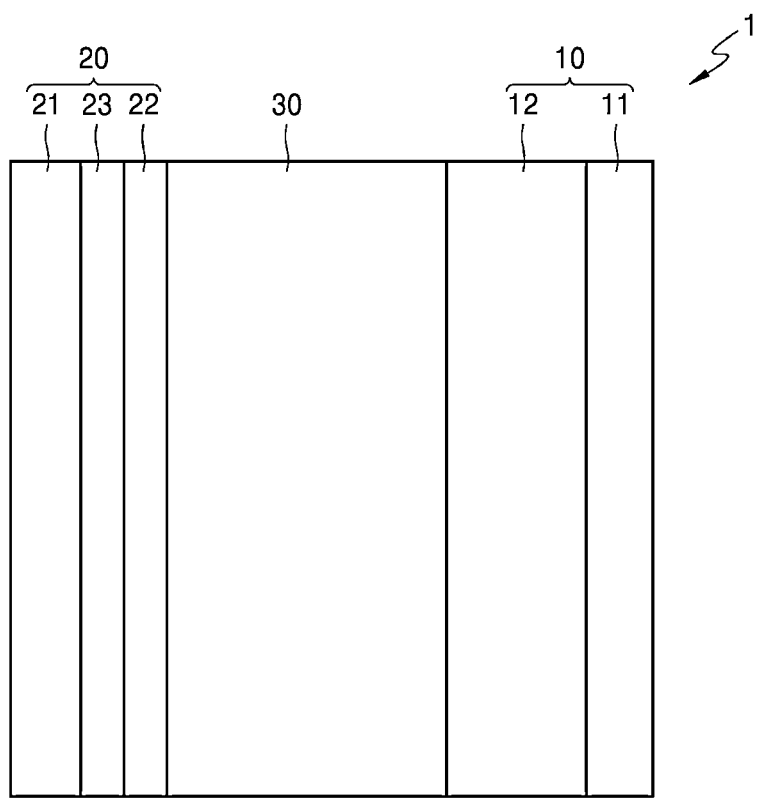

As shown in FIG. 10, a thin film 24 may be formed on the surface of the anode current collector 21. The thin film 24 may include an element capable of forming an alloy with lithium. Examples of the element capable of forming an alloy with lithium include gold (Au), silver (Ag), Zn, Sn, In, Si, Al, and bismuth (Bi). The thin film 24 may include one kind of these metals or several kinds of alloys. Due to the presence of the thin film 24, the deposition form of a metal layer 23 shown in FIG. 11 may be further flattened, thereby further improving the characteristics of the all-solid-state secondary battery 1.

The thickness of the thin film 24 is not particularly limited, and may be in a range of about 1 nm to about 5.00 nm. When the thickness of the thin film 24 is within this range, functions of the thin film 24 may sufficiently exhibited while the amount of deposition of lithium in the anode 20 is appropriate, and accordingly, the all-solid-state secondary battery 1 may have good characteristics. The thin film 24 may be formed on the anode current collector 21 by, for example, vacuum deposition, sputtering, or plating.

The anode-free coating layer 22 may include an anode active material which forms an alloy with lithium or a compound with lithium.

Examples of the anode active material include amorphous carbon, Au, Pt, Pd, Si, Ag, Al, Bi, Sn, Zn, or a combination thereof. Here, examples of amorphous carbon include carbon black (CB), acetylene black (AB), furnace black (FB), Ketjen black (KB), graphene, or a combination thereof.

The anode-free coating layer 22 may include only one kind of the anode active material or two or more kinds of the anode active material. For example, the anode-free coating layer 22 may include, as the anode active material, amorphous carbon only, or Au, Pt, Pd, Si, Ag, Al, Bi, Sn, Zn. In addition, the anode-free coating layer 22 may include a mixture of amorphous carbon and Au, Pt, Pd, Si, Ag, Al, Bi, Sn, Zn, or a combination thereof. Here, a mixing weight ratio of the mixture of amorphous carbon and Au, Pt, Pd, Si, Ag, Al, Bi, Sn, Zn, or combination thereof may be, for example, in a range of about 10:1 to about 1:2. When the anode active material is constituted of such materials above, the characteristics of the all-solid-state secondary battery 1 may be further improved.

Here, when Au, Pt, Pd, Si, Ag, Al, Bi, Sn, Zn, or a combination thereof is used as the anode active material, a particle size (i.e., an average particle diameter) of such anode active material may be about 4 μm or less. In this case, the characteristics of the all-solid-state secondary battery 1 may be further improved. Here, the particle diameter of the anode active material may be, for example, a median diameter (so-called D50) measured using a laser particle size distribution analyzer. In Examples and Comparative Examples below, particle diameters were measured by this method. The lower limit of the particle diameter is not particularly limited, but may be for example, about 10 nm.

In addition, the anode active material may include a mixture of a first particle, which is formed using amorphous carbon, and a second particle, which is formed with a metal or a semiconductor. Such a metal or a semiconductor may include, for example, Au, Pt, Pd, Si, Ag, Al, Bi, Sn, Zn, or a combination thereof. Here, an amount of the second particle may be in a range of about 8 weight % to about 60 weight %, for example about 10 weight % to about 50 weight %, based on the total weight of the mixture of the first particle and second particle. In this case, the characteristics of the all-solid-state secondary battery 1 may be further improved.

A thickness of the anode-free coating layer 22 is not particularly limited, and may be in a range of about 1 μm to about 20 μm. When the thickness of the anode-free coating layer 22 is within the range above, the characteristics of the all-solid-state secondary battery 1 may be sufficiently improved. When the binder is used, the thickness of the anode-free coating layer 22 may be controlled.

In the anode-free coating layer 22, an additive, such as a filler, a dispersant, or an ion conductive agent, may be appropriately mixed.

The solid electrolyte 30 may be used with another solid electrolyte.

The solid electrolyte may be formed of, for example, a sulfide-based solid electrolyte. A sulfide-based solid electrolyte material may include, for example, $Li_2S—P_2S_5$, $Li_2S—P_2S_5—LiX$ (X may be a halogen element, for example, I or Cl), $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (wherein m and n are each independently a positive number, and Z is one of Ge, Zn, or Ga), $Li_2S—GeS_2$, $Li_2S—SiS_2—Li_3PO_4$, or $Li_2S—SiS_2—Li_pMO_q$ (wherein p and q are each independently a positive number, and M is one of P, Si, Ge, B, Al, Ga, or In). Here, the sulfide-based solid electrolyte material may be prepared by treating a starting material (for example, $Li_2S$ or $P_2S_5$) by a melt quenching method or a mechanical milling method. In addition, following the treatment, heat-treatment may be performed thereon. The solid electrolyte 30 may be in an amorphous state, a crystalline state, or a mixture of both states.

The solid electrolyte 30 may be include an element(s) including at least sulfur (S), P, and Li, for example, a material including $Li_2S—P_2S_5$. Here, when $Li_2S—P_2S_5$ is used as the sulfide-based solid electrolyte materials, a mixing molar ratio of $Li_2S$ and $P_2S_5$ (i.e., $Li_2S:P_2S_5$) may be in a range of about 50:50 to about 90:10. In addition, the solid electrolyte 30 may further include a binder. Examples of the binder included in the solid electrolyte 30 include SBR, polytetrafluoroethylene, polyvinylidene fluoride, polyethylene, or a combination thereof. The binder included in the solid electrolyte 30 may be identical to or different from the binder included in the anode-free coating layer 22.

Hereinafter, embodiments will now be described more fully with reference to Examples and Comparative Examples below. However, these Examples are for illustrative purposes only, and are not intended to limit the scope of the present disclosure.

EXAMPLES

Example 1

A lithium precursor (LiOH), a tantalum precursor ($Ta_2O_5$), a hafnium precursor ($HfO_2$), and a phosphorus precursor (($NH_4$)$_2HPO_4$) were mixed at a stoichiometric ratio according to a composition ratio shown in Table 1, and then, were pulverized and mixed for 2 hours by using acetone and planetary mill containing zirconia balls, thereby obtaining a precursor mixture. An amount of acetone was about 100 parts by weight based on 100 parts by weight of the total weight of the precursor mixture. In preparing the precursor mixture, LiOH was used in excess of about 10 weight % to compensate for the loss of the lithium during subsequent heat-treatment.

The precursor mixture was heated at a heating rate of about 5° C./min at a temperature of 600° C., and then, first heat-treatment was performed thereon for 8 hours at the same temperature in an air atmosphere.

The first heat-treated product obtained by the process above was then subjected to planetary milling for 10 minutes.

The resulting product was heated at a heating rate of about 5° C./min at a temperature of 1,000° C., and then, second heat-treatment was performed thereon for 8 hours at 1,000° C. in an air atmosphere, so as to obtain a solid conductor powder having the composition of Table 1.

Examples 2 to 4 and 8

Solid conductor powders were each prepared in the same manner as in Example 1, except that the amount of the hafnium precursor ($HfO_2$) was controlled at a stoichiometric ratio, so as to obtain solid conductor powders having the composition of Table 1.

Examples 5 and 7

Solid conductor powders having the composition of Table 1 were each prepared in the same manner as in Example 2, except that lithium fluoride (LiF) was further added in preparing the precursor mixture. In Examples 5 and 7, the amount of LiF was controlled at a stoichiometric ratio according to the composition ratio of Table 1.

Example 6

A solid conductor powder having the composition of Table 1 was prepared in the same manner as in Example 2, except that lithium chloride (LiCl) was further added in preparing the precursor mixture. In Example 6, the amount of LiCl was controlled at a stoichiometric ratio according to the composition ratio of Table 1.

Examples 9, 11, and 12

Solid conductor powders having the composition of Table 1 were each prepared in the same manner as in Example 7, except that the hafnium precursor, $HfO_2$, was not added in preparing the precursor mixture and that the amount of each precursor was controlled at a stoichiometric ratio according to the composition ratio of Table 1.

Examples 10 and 13 to 16

Solid conductor powders having the composition of Table 1 were each prepared in the same manner as in Example 6, except that the hafnium precursor, $HfO_2$, was not added in preparing the precursor mixture and the amount of each precursor was controlled at a stoichiometric ratio according to the composition ratio of Table 1.

Examples 17 and 18

Solid conductor powders having the composition of Table 1 were each prepared in the same manner as in Example 1, except that silicon precursor ($SiO_2$) was further added in preparing the precursor mixture and the amount of each precursor was controlled at a stoichiometric ratio according to the composition ratio of Table 1.

Examples 8 and 19 to 29

Solid conductor powders were each prepared, except that each precursor was used to obtain solid conductor powders having the composition shown in Table 1, the amount of each precursor was controlled at a stoichiometric ratio, and the preparation was carried out according to the following process.

Here, as the precursors, LiOH (Sigma Aldrich), $Ta_2O_5$ (Alfa-Aesar, purity: 98% or higher), $HfO_2$ (Sigma Aldrich) or $ZrO_2$, $(NH_4)H_2PO_4$ (Sigma Aldrich), and LiF (Alfa-Aesar) were used.

Powders of each precursor were mixed at a stoichiometric ratio in a 45 ml zirconia container, and then, high-energy mechanical milling was performed thereon using a SPEX8000 together with anhydrous acetone. The ball-milled powders were pre-heated for 8 hours at a temperature of 600° C. and 1,000° C., respectively. The resulting products were compressed, so as to obtain pellets having a particle diameter of 12 mm. The pellets were covered with a mother powder to prevent the loss of lithium and were then subjected to heat-treatment at a temperature of 1,100° for 12 hours.

Comparative Example 1

A solid conductor having the composition of Table 1 was prepared in the same manner as in Example 1, except that the hafnium precursor, $HfO_2$, was not used in preparing the precursor mixture.

Comparative Example 2 and 4

Solid conductors having the composition of Table 1 were prepared in the same manner as in Example 1, except that the Li precursor, LiOH, the Ta precursor, $Ta_2O_5$, the hafnium precursor, $HfO_2$, and the P precursor, $(NH_4)_2HPO_4$, were mixed at a stoichiometric ratio according to a composition ratio shown in Table 1, and that LiF was further used in preparing the precursor mixture. Here, an amount of LiF was controlled at a stoichiometric ratio according to the composition ratio shown in Table 1.

Comparative Example 3

A solid conductor having the composition of Table 1 was prepared in the same manner as in Example 1, except that the Li precursor, LiOH, the Hf precursor, $HfO_2$, and the P precursor, $(NH_4)_2HPO_4$, were mixed at a stoichiometric ratio according to a composition ratio shown in Table 1, and that LiCl was further used in preparing the precursor mixture. Here, the amount of LiCl was controlled at a stoichiometric ratio according to the composition ratio shown in Table 1.

TABLE 1

|  | Composition |
| --- | --- |
| Example 1 | $Li_{1.025}Hf_{0.025}Ta_{1.975}PO_8$ |
| Example 2 | $Li_{1.05}Hf_{0.05}Ta_{1.95}PO_8$ |
| Example 3 | $Li_{1.1}Hf_{0.1}Ta_{1.9}PO_8$ |
| Example 4 | $Li_{1.25}Hf_{0.25}Ta_{1.75}PO_8$ |
| Example 5 | $Li_{0.9}Hf_{0.05}Ta_{1.95}PO_{7.85}F_{0.15}$ ($Li_{0.75}Hf_{0.05}Ta_{1.95}PO_{7.85}$•0.15LiF) |
| Example 6 | $Li_{0.9}Hf_{0.05}Ta_{1.95}PO_{7.85}Cl_{0.15}$ ($Li_{0.75}Hf_{0.05}Ta_{1.95}PO_{7.85}$•0.15LiCl) |
| Example 7 | $Li_{0.8}Hf_{0.05}Ta_{1.95}PO_{7.75}F_{0.25}$ ($Li_{0.55}Hf_{0.05}Ta_{1.95}PO_{7.75}$•0.25LiF) |
| Example 8 | $Li_{1.125}Hf_{0.125}Ta_{1.875}PO_8$ |
| Example 9 | $Li_{0.9}Ta_2PO_{7.9}F_{0.1}$ ($Li_{0.8}Ta_2PO_{7.9}$•0.1LiF)) |
| Example 10 | $Li_{0.9}Ta_2PO_{7.85}Cl_{0.1}$ ($Li_{0.8}Ta_2PO_{7.9}$•0.1LiCl) |
| Example 11 | $Li_{0.85}Ta_2PO_{7.85}F_{0.15}$ ($Li_{0.7}Ta_2PO_{7.85}$•0.15LiF) |
| Example 12 | $Li_{0.975}Ta_2PO_{7.975}F_{0.025}$ |
| Example 13 | $Li_{0.95}Ta_2PO_{7.95}F_{0.05}$ |
| Example 14 | $Li_{0.85}Ta_2PO_{7.85}Cl_{0.15}$ |
| Example 15 | $Li_{0.975}Ta_2PO_{7.975}Cl_{0.025}$ |
| Example 16 | $Li_{0.95}Ta_2PO_{7.95}Cl_{0.05}$ |

TABLE 1-continued

| | Composition |
|---|---|
| Example 17 | $Li_{1.05}Ta_{1.975}Hf_{0.025}P_{0.975}Si_{0.025}O_8$ |
| Example 18 | $Li_{1.2}Ta_{1.9}Hf_{0.1}P_{0.9}Si_{0.1}O_8$ |
| Comparative Example 1 | $LiTa_2PO_8$ |
| Comparative Example 2 | $LiHfTaPO_7F$ |
| Comparative Example 3 | $LiHf_2PO_6Cl_2$ |
| Comparative Example 4 | $LiHf_2PO_6F_2$ |
| Example 19 | $Li_{1.375}Hf_{0.375}Ta_{1.625}PO_8$ |
| Example 20 | $Li_{1.5}Hf_{0.5}Ta_{1.5}PO_8$ |
| Example 21 | $Li_{1.125}Zr_{0.125}Ta_{1.875}PO_8$ |
| Example 22 | $Li_{1.25}Zr_{0.25}Ta_{1.75}PO_8$ |
| Example 23 | $Li_{1.375}Zr_{0.375}Ta_{1.625}PO_8$ |
| Example 24 | $Li_{0.875}Ta_2PO_{7.875}F_{0.125}$ |
| Example 25 | $Li_{0.75}Ta_2PO_{7.75}F_{0.25}$ |
| Example 26 | $Li_{0.625}Ta_2PO_{7.625}F_{0.375}$ |
| Example 27 | $Li_{0.5}Ta_2PO_{7.5}F_{0.5}$ |
| Example 28 | $Li_{0.375}Ta_2PO_{7.375}F_{0.625}$ |
| Example 29 | $Li_{0.25}Ta_2PO_{7.25}F_{0.75}$ |

Evaluation Example 1: X-Ray Diffraction (XRD) Analysis

Figure 1B:
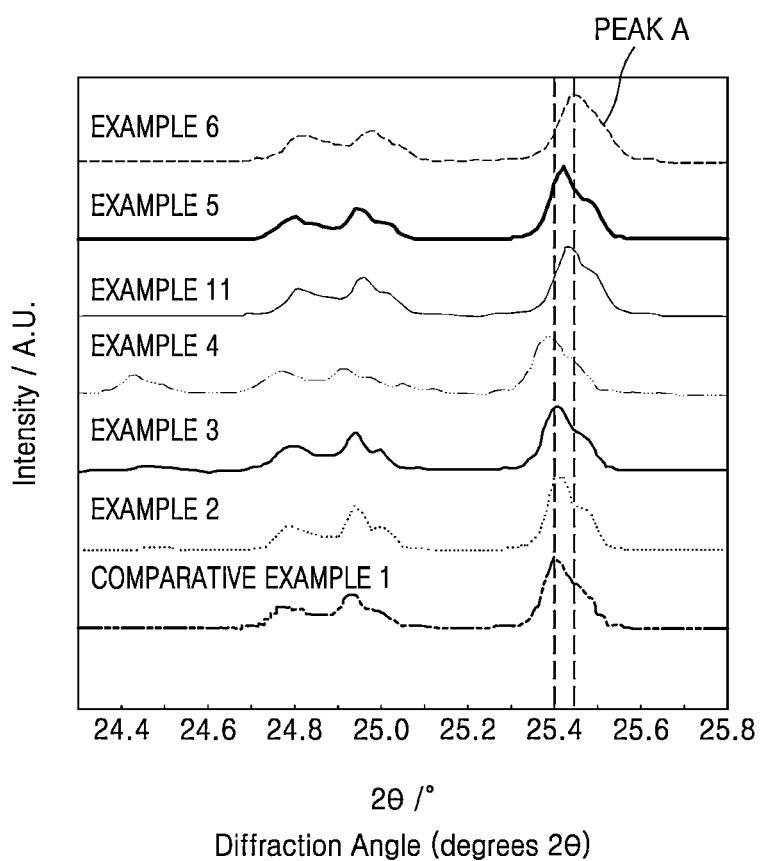
FIG. 1B shows an enlarged view of a portion of FIG. 1A.

X-ray diffraction (XRD) spectra of the solid conductors prepared according to Examples 2 to 6, 11, and Comparative Examples 1 and 2 were obtained, and the results are shown in FIGS. 1A and 1B. FIG. 1B shows an enlarged view of a portion of FIG. 1A. For the XRD analysis, Cu Kα radiation (λ=1.5406 Å) was used. The XRD analysis was performed by using D8 Advance manufactured by Bruker Company.

Referring to FIGS. 1A and 1B, it was confirmed that the solid conductors prepared according to Examples 2 to 6 and 11 showed the same XRD peak characteristics as those of the solid conductor prepared according to Comparative Example 1. Accordingly, it was also confirmed that the solid conductors prepared according to Examples 2 to 6 and 11 each had substantially the same crystal structure as the solid conductor prepared according to Comparative Example 1.

In addition, it was observed as shown in FIG. 1B that the solid conductor prepared according to Comparative Example 1 showed a peak (Peak A) having a diffraction angle of about 25.4°2θ. In addition, in the case of the solid conductor in which Hf was substituted (i.e., the solid conductors prepared according to Examples 2 to 4), Peak A was shifted compared to the solid conductor prepared according to Comparative Example 1. In the case of the solid conductor in which F and Hf or Cl and Hf were substituted (i.e., the solid conductors prepared according to Examples 5 to 6 and 11), Peak A was also shifted.

In detail, as shown in FIG. 1B, Peak A was appeared in the solid conductor prepared according to Example 11 at an angle of 25.43°2θ. When compared with Peak A appeared in the solid conductor prepared according to Comparative Example 1 (at a diffraction angle of about 25.4°2θ), Peak A of the solid conductor prepared according to Example 11 was shifted to the right by 0.03°2θ. In addition, Peak A was appeared in the solid conductor prepared according to Example 5 at an angle of 25.42°2θ. When compared with Peak A appeared in the solid conductor prepared according to Comparative Example 1 (at a diffraction angle of about 25.4°2θ), Peak A of the solid conductor prepared according to Example 5 was shifted to the right by 0.02°2θ. In addition, Peak A was appeared in the solid conductor prepared according to Example 6 at an angle of 25.45° 2θ. When compared with Peak A appeared in the solid conductor prepared according to Comparative Example 1 (at a diffraction angle of about 25.4°2θ), Peak A of the solid conductor prepared according to Example 6 was shifted to the right by 0.05°2θ. As such, the solid conductor in which F or Cl and Hf were substituted showed the results that Peak A was shifted by 0.02°2θ to 0.05°2θ as compared with the solid conductor prepared according to Comparative Example 1.

In addition, an interplanar spacing of the (221) plane of the solid conductor prepared according to Example 2 was reduced by about 0.007 Å as compared with the oxide prepared according to Comparative Example 1. The interplanar spacing of the (221) plane of the solid conductor prepared according to Example 2 was identified by the peak shown at a diffraction angle of about 25.4°2θ.

The results of the XRD analysis of the solid conductors prepared according to Examples 1 to 11 and Comparative Examples 1 and 2 are shown in Table 3.

TABLE 2

| — | Composition | Crystal structure (XRD) |
|---|---|---|
| Example 1 | $Li_{1.025}Hf_{0.025}Ta_{1.975}PO_8$ | $LiTa_2PO_8$ |
| Example 2 | $Li_{1.05}Hf_{0.05}Ta_{1.95}PO_8$ | $LiTa_2PO_8$ |
| Example 3 | $Li_{1.1}Hf_{0.1}Ta_{1.9}PO_8$ | $LiTa_2PO_8$ |
| Example 4 | $Li_{1.25}Hf_{0.25}Ta_{1.75}PO_8$ | $LiTa_2PO_8 + LiTa_3O_8$ |
| Example 5 | $Li_{0.9}Hf_{0.05}Ta_{1.95}PO_{7.85}F_{0.15}$ | $LiTa_2PO_8$ |
| Example 6 | $Li_{0.9}Hf_{0.05}Ta_{1.95}PO_{7.85}Cl_{0.15}$ | $LiTa_2PO_8$ |
| Example 7 | $Li_{0.8}Hf_{0.05}Ta_{1.95}PO_{7.75}F_{0.25}$ | $LiTa_2PO_8 + LiTa_3O_8$ |
| Example 8 | $Li_{1.125}Hf_{0.125}Ta_{1.875}PO_8$ | $LiTa_2PO_8 + LiTa_3O_8$ |
| Example 9 | $Li_{0.9}Ta_2PO_{7.9}F_{0.1}$ | $LiTa_2PO_8$ |

TABLE 2-continued

| — | Composition | Crystal structure (XRD) |
|---|---|---|
| Example 10 | $Li_{0.9}Ta_2PO_{7.9}Cl_{0.1}$ | $LiTa_2PO_8$ |
| Example 11 | $Li_{0.85}Ta_2PO_{7.85}F_{0.15}$ | $LiTa_2PO_8$ |
| Example 12 | $Li_{0.975}Ta_2PO_{7.975}F_{0.025}$ | $LiTa_2PO_8$ |
| Example 13 | $Li_{0.95}Ta_2PO_{7.95}F_{0.05}$ | $LiTa_2PO_8$ |
| Example 14 | $Li_{0.85}Ta_2PO_{7.85}Cl_{0.15}$ | $LiTa_2PO_8$ |
| Example 15 | $Li_{0.975}Ta_2PO_{7.975}Cl_{0.025}$ | $LiTa_2PO_8$ |
| Example 16 | $Li_{0.95}Ta_2PO_{7.95}Cl_{0.05}$ | $LiTa_2PO_8 + LiTa_3O_8$ |
| Example 17 | $Li_{1.05}Ta_{1.975}Hf_{0.025}P_{0.975}Si_{0.025}O_8$ | $LiTa_2PO_8 + LiTa_3O_8$ + unknown |
| Example 18 | $Li_{1.2}Ta_{1.9}Hf_{0.1}P_{0.9}Si_{0.1}O_8$ | $LiTa_2PO_8 + LiTa_3O_8$ |
| Comparative Example 1 | $LiTa_2PO_8$ | $LiTa_2PO_8$ |
| Comparative Example 2 | $LiHfTaPO_7F$ | $LiTaO_3 + Li_{0.8}Hf_{1.8}Ta_{0.2}(PO_4)_3$ + unknown |
| Comparative Example 3 | $LiHf_2PO_6Cl_2$ | $HfO_2 + Li_{0.87}Hf_{2.032}(PO_4)_3$ |

As shown in Table 2, it was confirmed that the solid conductors prepared according to Examples 1 to 16 each had substantially the same crystal structure as the solid conductor prepared according to Comparative Example 1. In addition, the solid conductors prepared according to Example 4, 17, and 18 each had $LiTaO_3$, which is a perovskite phase, in addition to $LiTa_2PO_8$. As such, when the solid conductor has a perovskite phase, the lithium stability of the solid conductor may be further improved.

In addition, regarding the solid conductors prepared according to Examples 2, 3, and 8 and Comparative Example 1, the XRD analysis was performed. The results of the XRD analysis are shown in FIG. 1C.

Figure 1C:
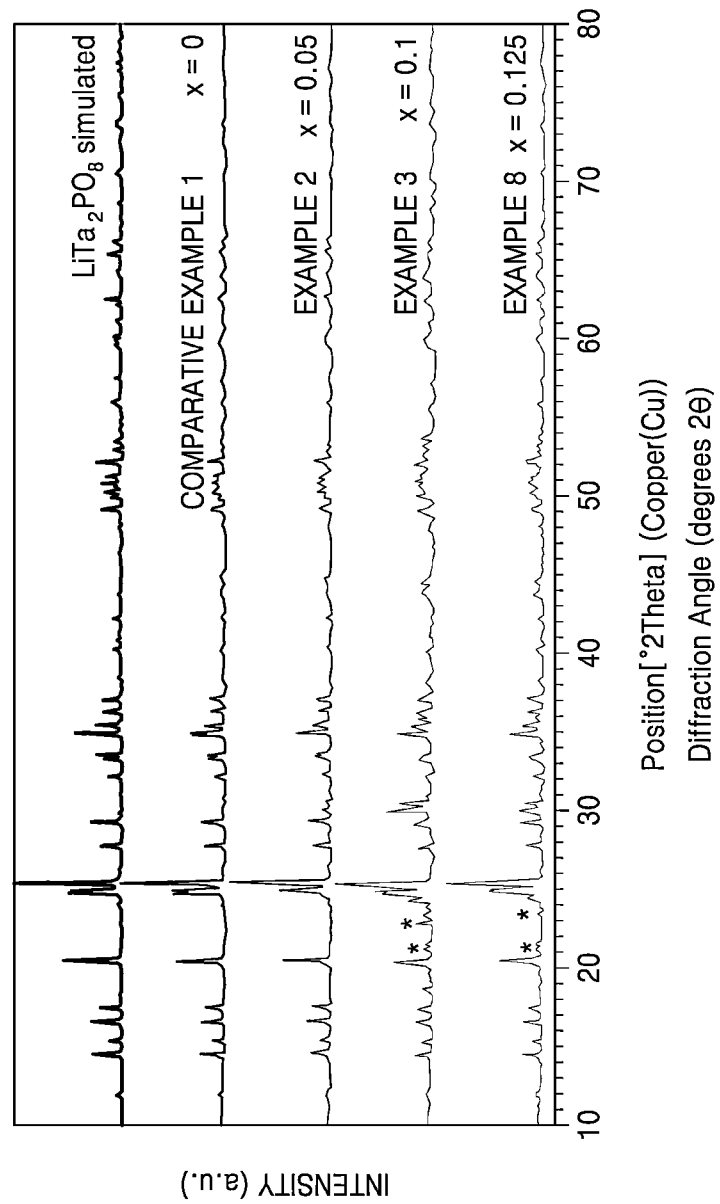
FIG. 1C is a graph of intensity in arbitrary units (a.u.) versus diffraction angle (°2θ) of $LiTa_2PO_8$ and solid conductors doped with hafnium, when analyzed by X-ray diffraction (XRD) analysis using Cu Kα radiation.

Referring to FIG. 1C, it was confirmed that, when the amount of Hf increased to be equal to greater than 0.1, impurities were observed at a diffraction angle in a range of 21°2θ to 25°2θ.

Evaluation Example 2: Measurement of Ionic Conductivity and Activation Energy

The solid conductor powders prepared according to Examples 1 to 18 and Comparative Examples 1 and 2 were pressed for 5 minutes at a pressure of 6 tons to be pelletized, thereby obtaining respective solid conductor pellets (thickness: about 500 μm). The surface of the solid conductor pellet was completely covered with a mother powder having the same composition as that of the solid conductor pellet, so as to minimize changes in the composition caused by lithium volatilized during heat-treatment. The heat-treatment was performed on the resulting solid conductor pellet for 12 hours at a temperature of 1,100° C. Then, both surfaces of the heat-treated solid conductor pellet were polished using a SiC sandpaper. Afterwards, as a blocking electrode, an Au electrode was deposited on the both surfaces of the solid conductor pellet according to a sputtering method using an MTI sputtering coater, thereby preparing an Au/solid conductor pellet/Au structure.

Regarding the Au/solid conductor pellet/Au structure, the electrochemical impedance spectroscopy (EIS) was performed for analysis. The EIS analysis was performed at an amplitude of about 10 mV and a frequency of 0.1 Hz. The total resistance ($R_{total}$) value was obtained from the impedance result, and the conductivity value was calculated by correcting the electrode area and the solid conductor pellet thickness. In addition, at the time of the EIS measurements, the activation energy (Ea) value for Li ion conduction was calculated from the result obtained by changing the measured temperature of the chamber where each solid conductor sample was loaded. The Ea value was calculated from the slope value obtained by converting the conductivity value measured by temperatures in the interval of 298 K to 378 K into Arrhenius plot (Ln (σT) vs. 1/T) of Equation 1:

$$\sigma T = A^{(Ea/RT)} \quad \text{Equation 1}$$

In Equation 1, Ea indicates activation energy, T indicates an absolute temperature, A indicates a pre-exponential factor, σ indicates a conductivity, and R indicates a gas constant.

Figure 4A:
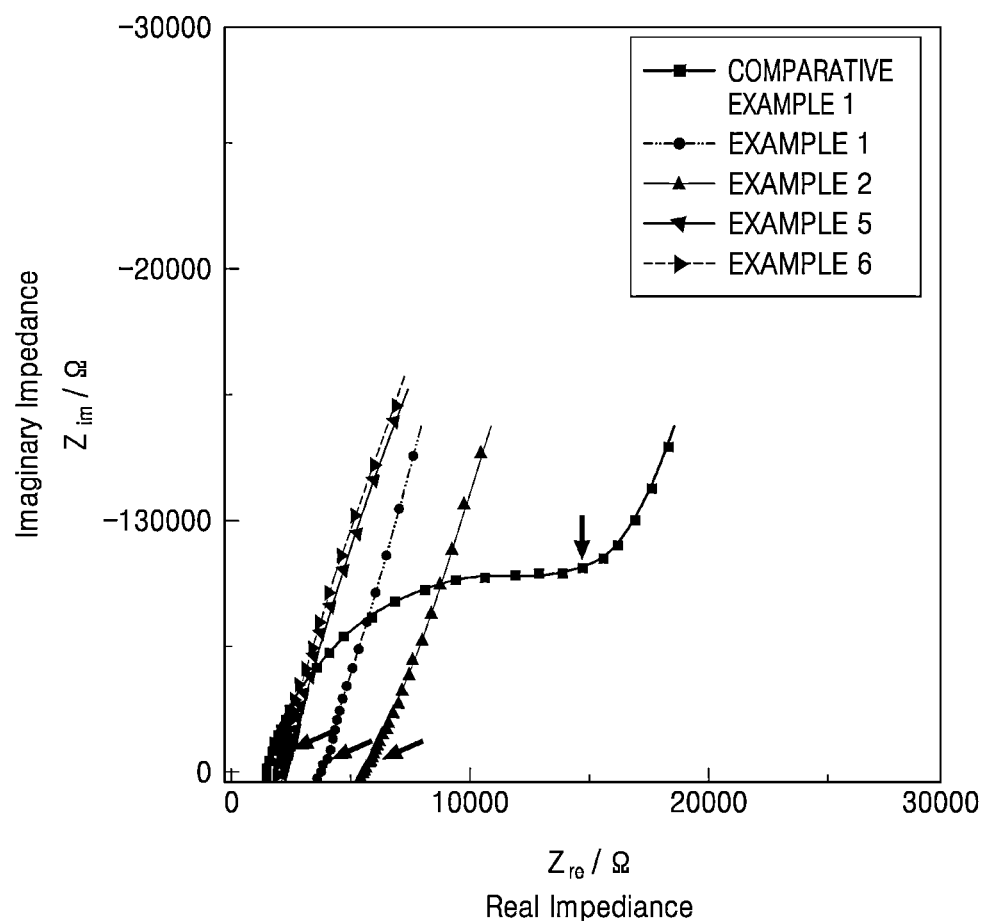
FIG. 4A is a graph of imaginary impedance ($Z_{im}/\Omega$) versus real impedance ($Z_{re}/\Omega$) and shows the ionic conductivity of the solid conductors of Examples 1, 2, 5, 6, and Comparative Example 1.
Figure 4B:
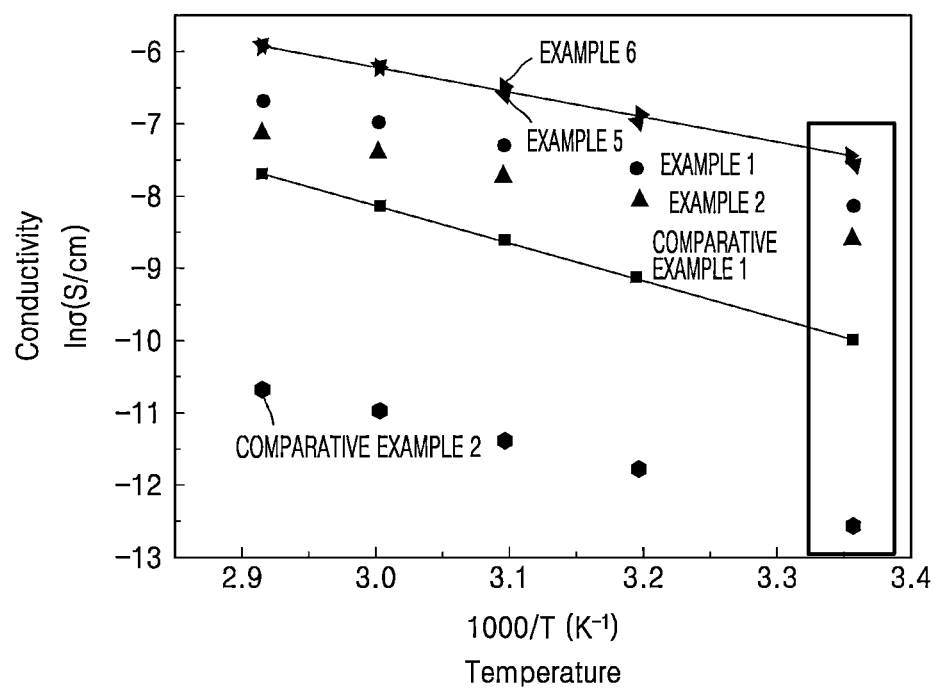
FIG. 4B is a graph of conductivity (Siemens per centimeter (S/cm)) versus temperature (1000/Kelvin (K)) showing the activation energy of the solid conductors of Examples 1, 2, 5, 6, and Comparative Example 1.

Some of the activation energy analysis results obtained according to the process above are shown in FIGS. 4A and 4B and Table 3.

TABLE 3

| | | σ (mS/cm @25° C.) | | Ea |
|---|---|---|---|---|
| | Composition | Li⁺, bulk | Li⁺, total | (eV/atom) |
| Example 1 | $Li_{1.025}Hf_{0.025}Ta_{1.975}PO_8$ | 1.54 | $6.6 \times 10^{-1}$ | 0.35 |
| Example 2 | $Li_{1.05}Hf_{0.05}Ta_{1.95}PO_8$ | $2.8 \times 10^{-1}$ | $2.8 \times 10^{-1}$ | 0.29 |
| Example 3 | $Li_{1.1}Hf_{0.1}Ta_{1.9}PO_8$ | $1.8 \times 10^{-1}$ | $1.8 \times 10^{-1}$ | 0.29 |
| Example 4 | $Li_{1.25}Hf_{0.25}Ta_{1.75}PO_8$ | $4.7 \times 10^{-2}$ | $3.9 \times 10^{-2}$ | 0.33 |
| Example 5 | $Li_{0.9}Hf_{0.05}Ta_{1.95}PO_{7.85}F_{0.15}$ | $5.4 \times 10^{-1}$ | $5.4 \times 10^{-1}$ | 0.31 |
| Example 6 | $Li_{0.9}Hf_{0.05}Ta_{1.95}PO_{7.85}Cl_{0.15}$ | $5.9 \times 10^{-1}$ | $5.9 \times 10^{-1}$ | 0.30 |
| Example 7 | $Li_{0.8}Hf_{0.05}Ta_{1.95}PO_{7.75}F_{0.25}$ | $2.1 \times 10^{-1}$ | $2.1 \times 10^{-1}$ | — |
| Example 11 | $Li_{0.85}Ta_2PO_{7.85}F_{0.15}$ | $7.3 \times 10^{-2}$ | $7.2 \times 10^{-2}$ | 0.35 |
| Example 12 | $Li_{0.975}Ta_2PO_{7.975}F_{0.025}$ | $1.1 \times 10^{-1}$ | $5.6 \times 10^{-2}$ | 0.42 |
| Example 13 | $Li_{0.95}Ta_2PO_{7.95}F_{0.05}$ | $2.1 \times 10^{-1}$ | $7.4 \times 10^{-2}$ | 0.37 |
| Example 14 | $Li_{0.85}Ta_2PO_{7.85}Cl_{0.15}$ | $2.4 \times 10^{-1}$ | $7.2 \times 10^{-2}$ | 0.39 |
| Example 15 | $Li_{0.975}Ta_2PO_{7.975}Cl_{0.025}$ | $2.2 \times 10^{-1}$ | $3.8 \times 10^{-2}$ | 0.42 |
| Example 16 | $Li_{0.95}Ta_2PO_{7.95}Cl_{0.05}$ | $7.3 \times 10^{-2}$ | $7.2 \times 10^{-2}$ | 0.35 |
| Example 17 | $Li_{1.05}Ta_{1.975}Hf_{0.025}P_{0.975}Si_{0.025}O_8$ | $1.7 \times 10^{-1}$ | $1.7 \times 10^{-1}$ | 0.29 |

TABLE 3-continued

|  | Composition | σ (mS/cm @25° C.) Li+, bulk | σ (mS/cm @25° C.) Li+, total | Ea (eV/atom) |
|---|---|---|---|---|
| Example 18 | $Li_{1.2}Ta_{1.9}Hf_{0.1}P_{0.9}Si_{0.1}O_8$ | $2.1 \times 10^{-1}$ | $2.1 \times 10^{-1}$ | 0.30 |
| Comparative Example 1 | $LiTa_2PO_8$ | $7.2 \times 10^{-1}$ | $4.6 \times 10^{-2}$ | 0.45 |
| Comparative Example 2 | $LiHfTaPO_7F$ | $1.1 \times 10^{-2}$ | $3.6 \times 10^{-3}$ | — |
| Comparative Example 3 | $LiHf_2PO_6Cl_2$ | $4.7 \times 10^{-3}$ | $9.1 \times 10^{-4}$ | — |

In Table 3, Li+, bulk indicates lithium ion bulk conductivity, and Li+, tot indicates total lithium ion conductivity. As shown in Table 3, it was confirmed that the solid conductors prepared according to Examples 1 to 18 had improved ionic conductivity at room temperature (25° C.) as compared with the solid conductors prepared according to Comparative Examples 1 to 3. The solid conductors of Examples 4 and 15 had lower Li+, tot than the solid conductors of Comparative Example 1, but the solid conductors of Examples 4 and 15 had improved lithium stability.

In addition, the solid conductors prepared according to Examples 1 to 6 and Examples 8 to 18 had a small activation energy value, e.g., 0.42 eV/atom, as compared with the solid conductors prepared according to Comparative Examples 1 to 3. As such, when the activation energy of the solid conductor was reduced, the ionic conductivity at a low temperature was improved. Also, the solid conductors of Examples 8 to 10 exhibited ionic conductivity equivalent to those of the solid conductor of Example 7.

In addition, regarding the solid conductors prepared according to Examples 1 to 3 and Examples 5 to 8 and Comparative Example 1, the conductivity thereof was evaluated. The results of the evaluation are shown in Table 4.

The conductivity was measured at 50 mV in a frequency range of 5 MHz to 1 Hz according to the Ac Electrochemical Impedance Spectroscopy (EIS) at a temperature of 21° C.

Evaluation Example 3: Activation Energy and Mean-Square Displacements (MSDs) (Calculations)

Regarding the solid conductors prepared according to Examples 4 and 8 and Comparative Examples 1 and 4, the diffusivity (D)(unit: cm$^2$/s) by diffusion of Li ions before and after the introduction of a dopant to the solid conductors were each calculated according to the nudged elastic band (NEB) calculation, and results thereof are shown in FIGS. 2A to 2D.

Figure 2A:
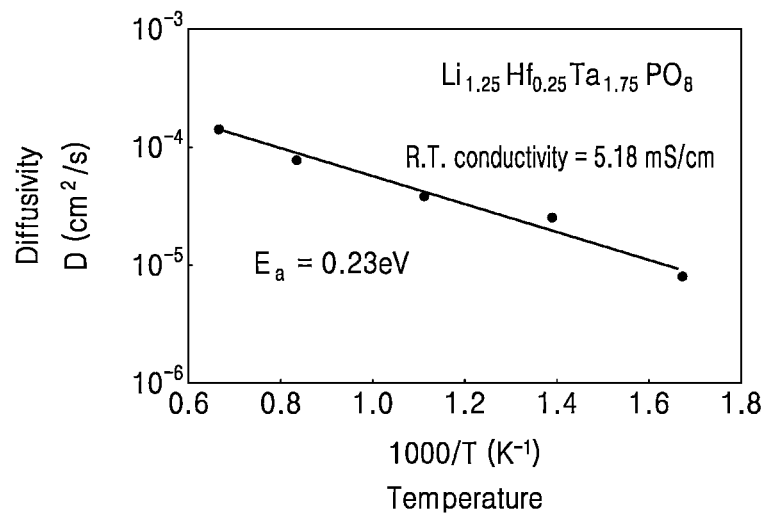
FIGS. 2A to 2D are each a graph of diffusivity (square centimeters per second ($cm^2/S$)) versus temperature ($K^{-1}$) showing the diffusivity of lithium (Li) ions before and after introduction of a dopant to a solid conductor of Example 4, Example 8, Comparative Example 1, and Comparative Example 4, respectively.
Figure 2B:
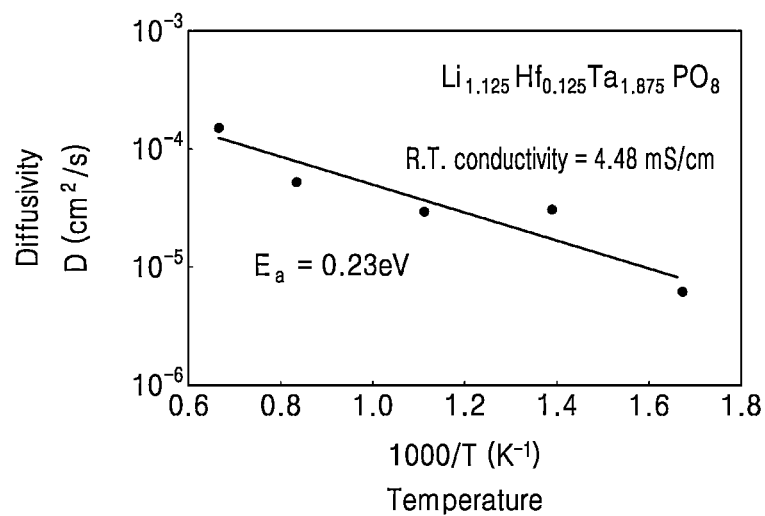
Figure 2C:
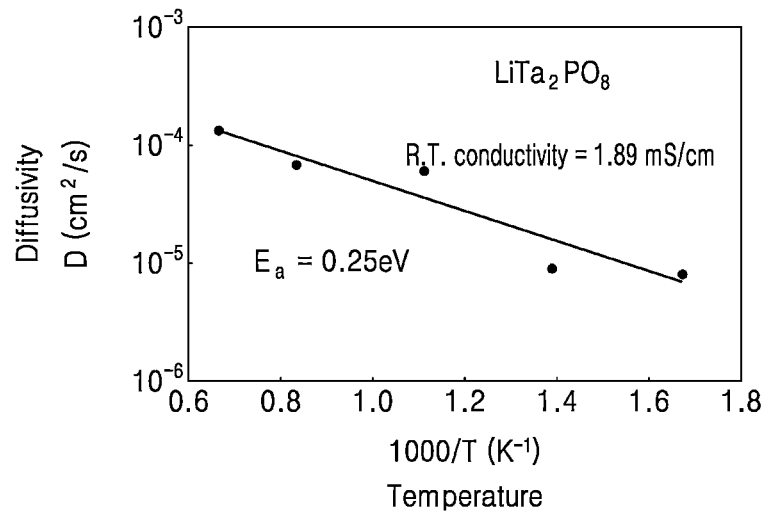
Figure 2D:
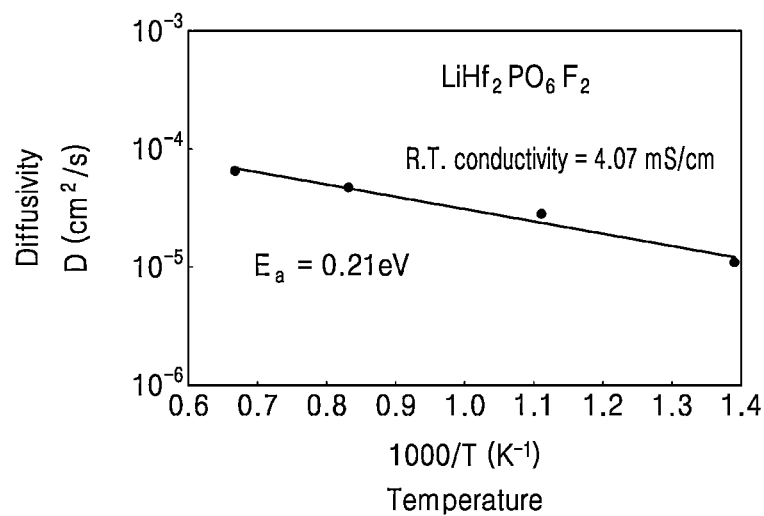

The solid conductors prepared according to Examples 4 and 8 shown in FIGS. 2A and 2B showed a significant increase in the ionic conductivity as compared with the solid conductor prepared according to Comparative Example 1 shown in FIG. 2C and the solid conductor prepared according to Comparative Example 4 shown in FIG. 2D. Accordingly, it was confirmed that the solid conductors prepared according to Examples 4 and 8 had increased isotropy in the ion conduction path, unlike the case of the solid conductors prepared according to Comparative Examples 1 and 2.

Figure 3A:
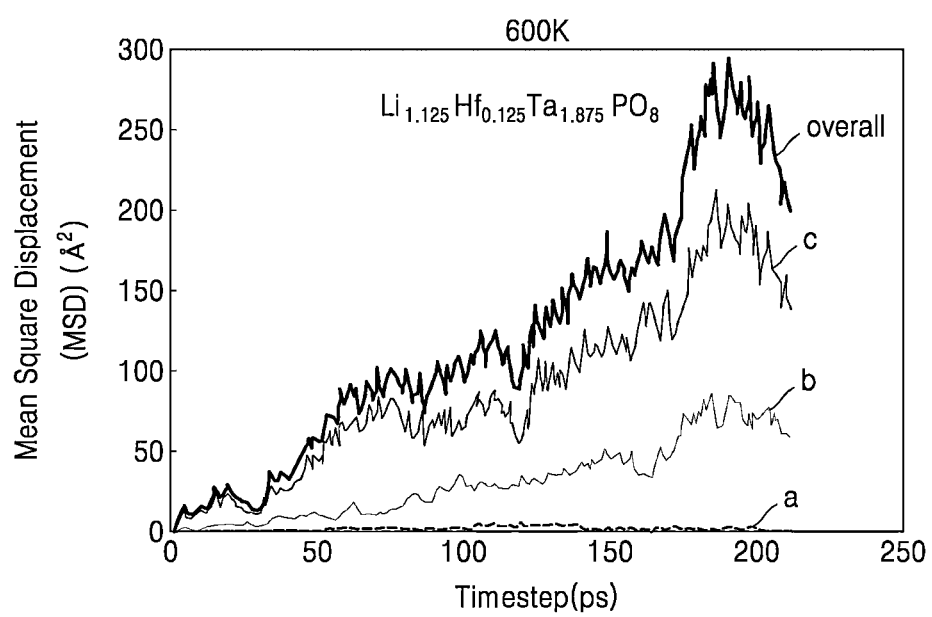
FIGS. 3A and 3B are each a graph of mean-square displacement (square angstroms ($Å^2$)) versus timestep (picoseconds (ps)) showing the diffusion of Li ions before and after introduction of a dopant to the solid conductor of Example 4 and Comparative Example 1, respectively.
Figure 3B:
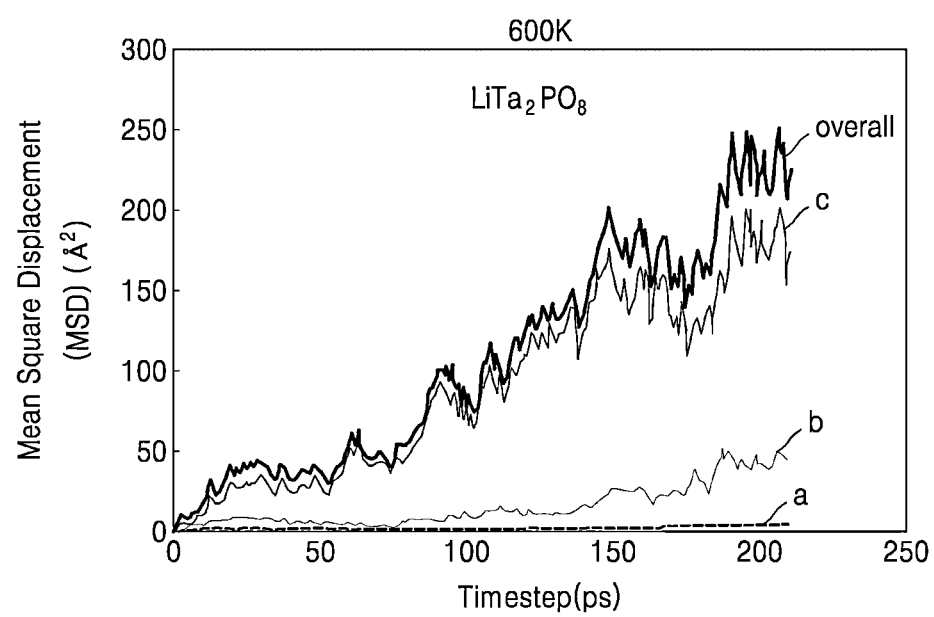

In addition, regarding the solid conductors prepared according to Example 4 and Comparative Example 1, the MSDs by diffusion of Li ions before and after the introduction of a dopant to the solid conductors were each calculated according to the NEB calculation, and results thereof are shown in FIGS. 3A and 3B. In FIGS. 3A to 3C, a indicates

TABLE 4

|  | Composition of solid conductor | Bulk conductivity (mS/cm) | Total conductivity (mS/cm) | Density (%) |
|---|---|---|---|---|
| Comparative Example 1 | $LiTa_2PO_8$ | 1.99 | 0.013 | 97.3 |
| Example 8 | $Li_{1.125}Hf_{0.125}Ta_{1.875}PO_8$ | 1.09 | 0.25 | 92.3 |
| Example 7 | $Li_{0.8}Hf_{0.05}Ta_{1.95}PO_{7.75}F_{0.25}$ | — | 0.21 | — |
| Example 5 | $Li_{0.9}Hf_{0.05}Ta_{1.95}PO_{7.85}F_{0.15}$ | — | 0.79 | — |
| Example 3 | $Li_{1.1}Hf_{0.1}Ta_{1.9}PO_8$ | 1.32 | 0.30 | 94.6 |
| Example 2 | $Li_{1.05}Hf_{0.05}Ta_{1.95}PO_8$ | 1.72 | 0.43 | 91.4 |
| Example 1 | $Li_{1.025}Hf_{0.025}Ta_{1.975}PO_8$ | 1.54 | 0.658 | 92.6 |

Referring to Table 4, it was confirmed that the doping with Hf improved the total conductivity. The level of the total conductivity was highest when x=0.025, and the value of the total conductivity was 0.658 mS/cm. It was also confirmed that doping with Hf reduced the activation energy from 0.45 eV (x=0) to 0.29 eV (x=0.05).

In addition, regarding the solid conductors doped with F and Hf, the impedance and conductivity characteristics were evaluated. The results of the evaluation are shown in FIGS. 4C and 4D, respectively.

Figure 4C:
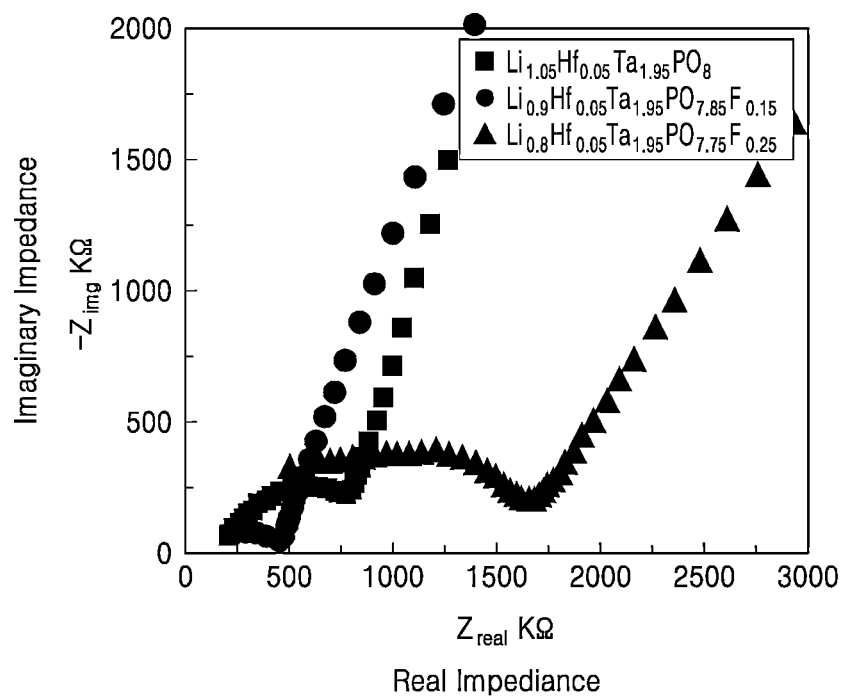
FIG. 4C is a graph of imaginary impedance ($-Z_{img}$, kilo-ohms, KΩ) versus real impedance ($Z_{real}$, kilo-ohms, KΩ) and shows the impedance characteristics of solid conductors that are doped with fluorine and hafnium.
Figure 4D:
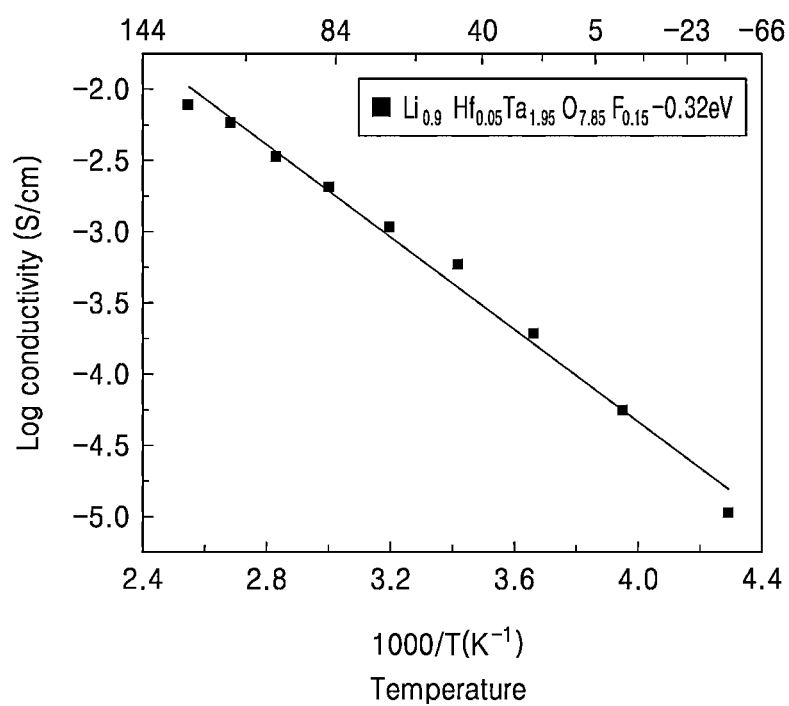
FIG. 4D is a graph of log conductivity (Siemens per centimeter (S/cm)) versus temperature ((1000/Kelvin (K)) of a solid conductor that is doped with fluorine and hafnium.

As shown in FIG. 4C, one semicircle was observed with respect to the solid conductor doped with F, and on this basis, the total conductivity was calculated.

the MSD along the x-axis, b indicates the MSD along the y-axis, c indicates the MSD along the z-axis, and overall indicates the net value of the MSD.

As compared with the solid conductors prepared according to Comparative Example 1, the oxide prepared according to Example 4 showed a reduction of the anisotropy in the diffusion path (i.e., increased mobility along a and b axes), resulting in increased ionic conductivity overall. Accordingly, it was confirmed that the solid conductors prepared according to Example 4 had increased isotropy in the ion conduction path.

FIGS. 3B and 3A each show the calculated mean-square displacements for Li ions diffusion along a ([100]), b ([010]), c ([001]) crystal lattice directions in the un-doped LiTa$_2$PO$_8$ and Hf-doped Li$_{1.25}$Hf$_{0.25}$Ta$_{1.75}$PO$_8$, respectively. Referring to the figures, it was determined that the Li-ion diffusion is limited mainly along the c-lattice, and that the Hf dopant was able to improve the lithium diffusion along the b-axis.

Evaluation Example 4: Cyclovoltammetry

The solid conductor powders prepared according to Example 5 and Comparative Example 1 were pressed for 5 minutes at a pressure of 6 tons to be pelletized, thereby obtaining respective solid conductor pellets (thickness: about 500 μm). The surface of the solid conductor pellet was completely covered with a mother powder having the same composition as that of the solid conductor pellet, so as to minimize changes in the composition caused by lithium volatilized during heat-treatment. The heat-treatment was performed on the resulting solid conductor pellet for 12 hours at a temperature of 1,100° C. Then, both surfaces of the heat-treated solid conductor pellet were polished using a SiC sandpaper. Afterwards, a Au electrode was deposited on the both surfaces of the solid conductor pellet according to a sputtering method, thereby preparing a Au/solid conductor pellet/Au structure. The structure was subjected to 3 cycles of cyclovoltammetry at a scan rate of 1 mV/s, thus performing the cyclovoltammetry of the structure. The current density of the structure was measured at a voltage range of about 2.0 V to about 4.6 V, and results thereof are shown in FIG. 5.

Figure 5:
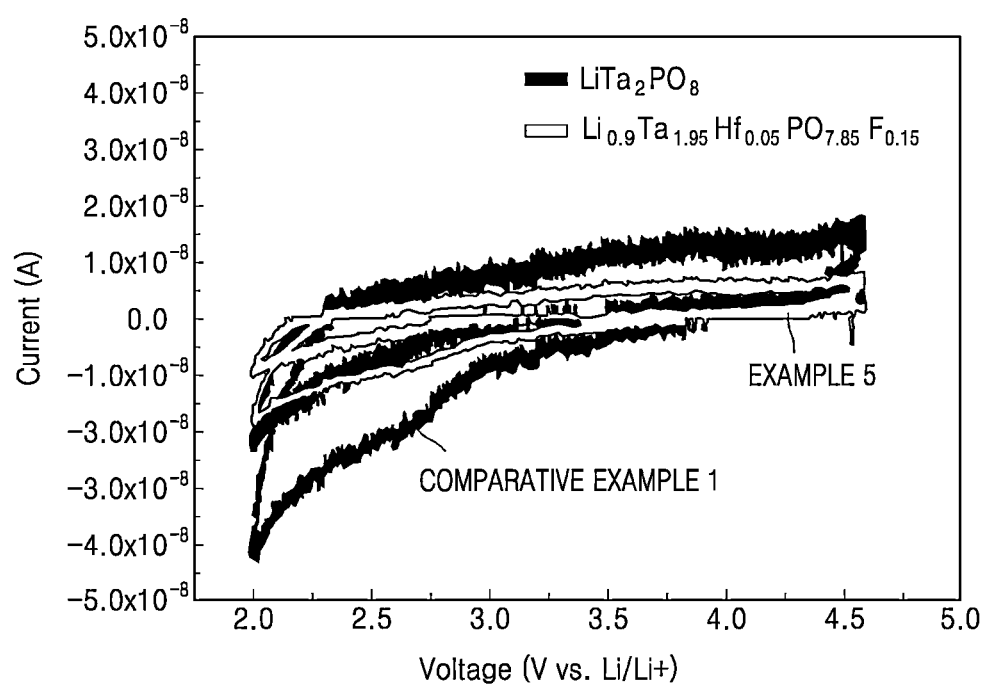
FIG. 5 is a graph of current (amperes (A)) versus Voltage (Volts (V) vs Li/Li$^+$) and shows the results of cyclic voltammetry analysis of the solid conductors of Example 5 and Comparative Example 1.

Referring to FIG. 5, it was confirmed that the solid conductor prepared according to Example 5 was stable up to 4.6V$_{Li/L+}$.

Evaluation Example 5: Lithium Stability

The solid conductor powders prepared according to Example 9 and Comparative Example 1 were pressed for 5 minutes at a pressure of 6 tons to be pelletized, thereby obtaining respective solid conductor pellets (thickness: about 500 μm). The surface of the solid conductor pellet was completely covered with a mother powder having the same composition as that of the solid conductor pellet, so as to minimize changes in the composition caused by lithium volatilized during heat-treatment. The heat-treatment was performed on the resulting solid conductor pellet for 12 hours at a temperature of 1,100° C. in an air atmosphere. Then, both surfaces of the heat-treated solid conductor pellet were polished using a SiC sandpaper. Afterwards, a Li electrode was deposited on the both surfaces of the solid conductor pellet, and then the resulting structure is pressed by a cold isostatic press (CIP), thereby preparing a Li symmetric cell.

Figure 6A:
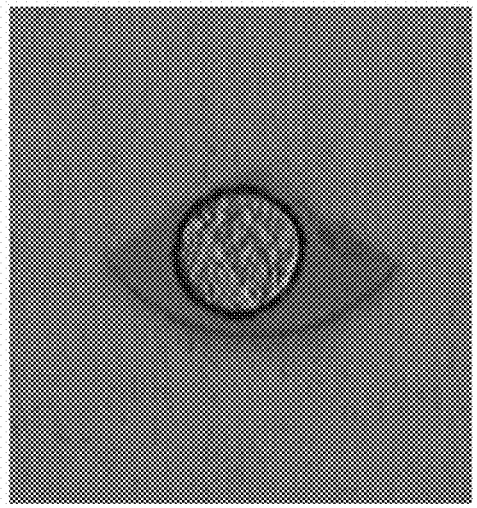
FIGS. 6A and 6B show results of the Li stability evaluation of a lithium symmetric cell including the solid conductors of Example 9 and Comparative Example 1, respectively.
Figure 6B:
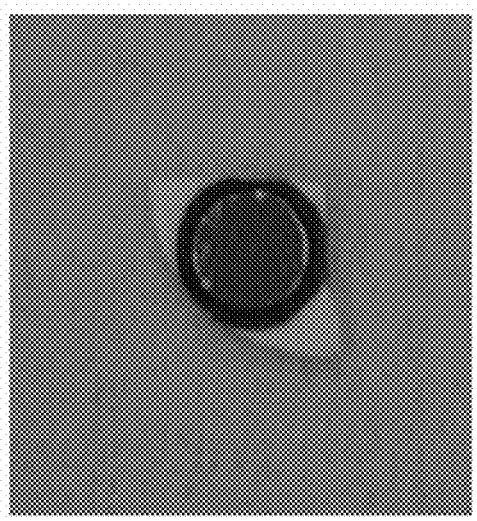

The state changes after a Li symmetric cell using the solid conductor prepared according to Example 9 and a Li symmetric cell using the solid conductor prepared according to Comparative Example 1 were left for 3 days were shown in FIGS. 6A and 6B. FIG. 6A shows the Li symmetric cell using the solid conductor prepared according to Example 9, and FIG. 6B shows the Li symmetric cell using the solid conductor prepared according to Comparative Example 1.

As shown in FIGS. 6A and 6B, the Li symmetric cell using the solid conductor prepared according to Example 9 showed that the degree of discoloration of lithium was reduced as compared with the Li symmetric cell using the solid conductor prepared according to Comparative Example 1. Accordingly, it was confirmed that the solid conductor prepared according to Example 9 had improved lithium stability as compared with the solid conductor prepared according to Comparative Example 1.

Evaluation Example 6: $^{31}$P-Nuclear Magnetic Resonance (NMR) Analysis

Regarding the solid conductors prepared according to Examples 1, 2, 3, and 8 and Comparative Example 1, the $^{31}$P-NMR analysis was performed. The $^{31}$P-NMR analysis was performed by using the Bruker Avance-III 500 spectrometer at the Larmor frequency of 202.4 MHz. The $^{31}$P NMR spectrum was corrected to 85% H$_3$PO$_4$ at 0 ppm.

Figure 7A:
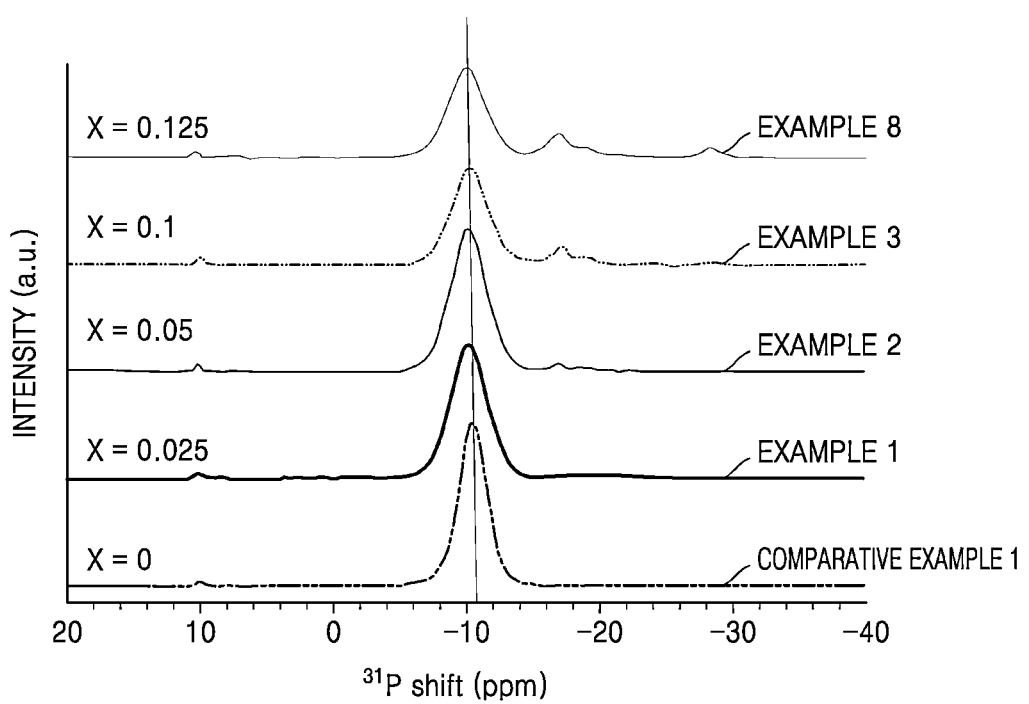
FIG. 7A is a graph of intensity (arbitrary units, a.u.) versus chemical shift (parts per million) showing the results of $^{31}$P-NMR analysis of solid conductors of Examples 1 to 3, 8, and Comparative Example 1.
Figure 7B:
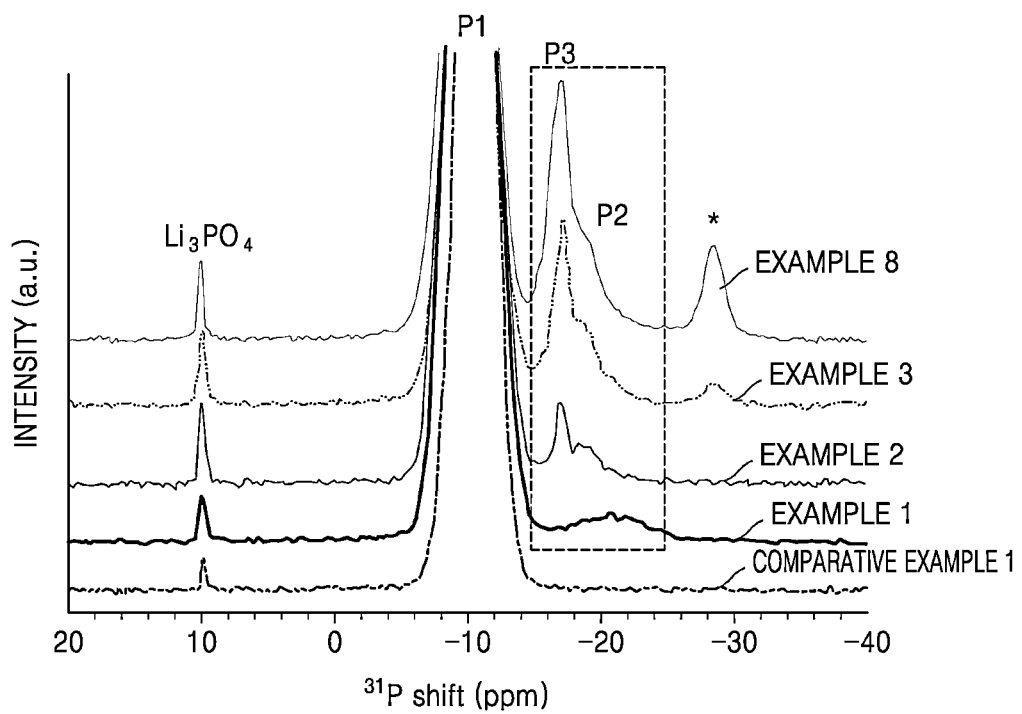
FIG. 7B is a graph of intensity (arbitrary units, a.u.) versus chemical shift (parts per million) showing an enlarged view of a portion of FIG. 7A.

Results of the $^{31}$P-NMR analysis are shown in FIGS. 7A and 7B and Table 5.

TABLE 5

| — | Presence of secondary peaks P2 and P3 |
|---|---|
| Example 1 | ○ |
| Example 2 | ○ |
| Example 3 | ○ |
| Example 8 | ○ |
| Comparative Example 1 | X |

In FIG. 7B, P1 indicates pristine sample PO$_4$ having Ta in the second coordination shell of phosphorus (P), and P2 may be generated by Hf in the second coordination site of P.

P3 indicates hafnium phosphate, which also appears in the XRD spectrum. When the level of Hf doping was greater than 0.1, additional impurities were observed at −30 ppm, and the presence of lithium phosphate was observed at about 10 ppm.

Accordingly, when Hf was doped into Ta, the secondary peaks P2 and P3 were observed at chemical shifts in the $^{31}$P-NMR analysis between −15 ppm and −22 ppm. As described above, as the amount of Hf doped into Ta of the solid conductor increased, the FWHM of the primary peak also increased. Accordingly, it was confirmed from the XRD analysis results that the crystal structure of the solid conductor was maintained by doping with Hf, and it was also confirmed from the $^{31}$P-NMR analysis results that Hf was doped into the crystal structure of the solid conductor. In addition, the secondary peaks P2 and P3 were observed in the solid conductors prepared according to Examples 1 to 8, unlike the solid conductor prepared according to Comparative Example 1.

Figure 7C:
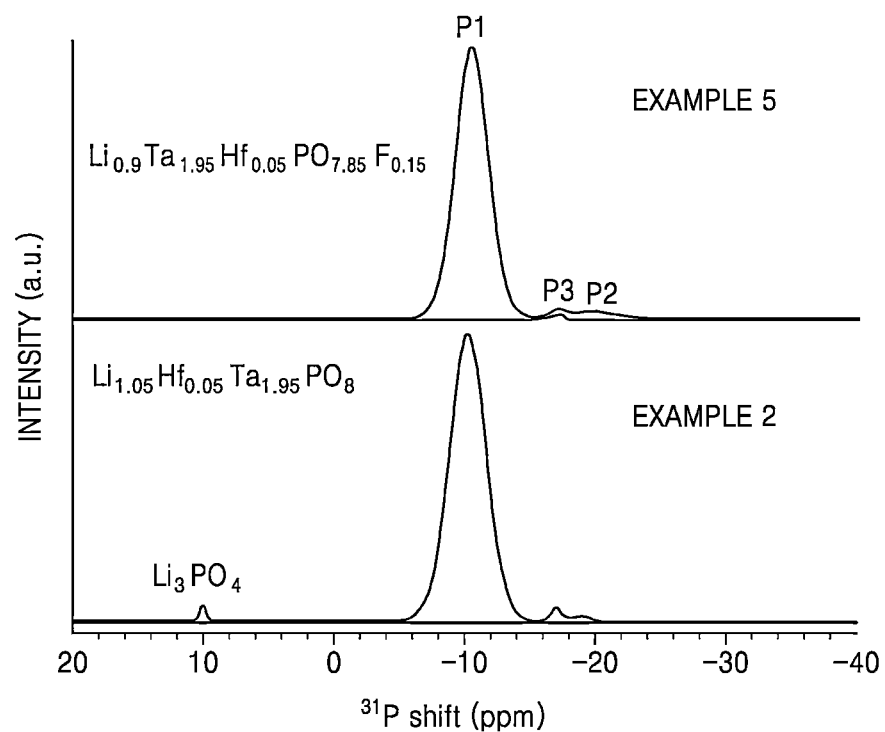
FIG. 7C is a graph of intensity in arbitrary units (a.u) versus $^{31}$P chemical shift (parts per million (ppm)) showing the results of $^{31}$P-NMR analysis of solid conductors of Examples 2 and 5.

In addition, regarding the solid conductors prepared according to Examples 2 and 5, the $^{31}$P-NMR analysis was performed, and the results of the analysis are shown in FIG. 7C. The FWHM values of the P1 peaks of FIG. 7C are shown in Table 6.

The Li$_3$PO$_4$ phase was removed by doping with fluorine, and it was observed that the P2 which related to Hf in the second coordination environment of P shows a broader peak shape in the F-doped sample.

TABLE 6

| | FWHM of primary peak (P1) |
|---|---|
| Example 2 | 4 |
| Example 5 | 3 |

Evaluation Example 7: Phase Stability

The energy above hull for the solid conductors shown in the table 7 below was determined. The energy above hull was calculated through the phase diagram analysis, and the results of the analysis are shown in Table 7. The energy above hull is a measure of the phase stability of a certain composition represented by a given chemical formula.

TABLE 7

| | Dopant | Composition | Energy above hull (meV/atom) | Possible impurity phases during synthesis |
|---|---|---|---|---|
| Comparative Example 1 | without dopant | $LiTa_2PO_8$ | 19.5 | $Ta_9PO_{25}$, $Li_3PO_4$, $TaPO_5$ |
| Example 8 | Hf | $Li_{1.125}Hf_{0.125}Ta_{1.875}PO_8$ | 22.7 | $Ta_9PO_{25}$, $TaPO_5$, $Li_3PO_4$, $HfO_2$ |
| Example 4 | dopant | $Li_{1.25}Hf_{0.25}Ta_{1.75}PO_8$ | 27.0 | $Ta_9PO_{25}$, $TaPO_5$, $Li_3PO_4$, $HfO_2$ |
| Example 19 | | $Li_{1.375}Hf_{0.375}Ta_{1.625}PO_8$ | 31.7 | $Ta_9PO_{25}$, $TaPO_5$, $Li_3PO_4$, $HfO_2$ |
| Example 20 | | $Li_{1.5}Hf_{0.5}Ta_{1.5}PO_8$ | 38.6 | $Ta_9PO_{25}$, $TaPO_5$, $Li_3PO_4$, $HfO_2$ |
| Example 21 | Zr | $Li_{1.125}Zr_{0.125}Ta_{1.875}PO_8$ | 24.5 | $Ta_9PO_{25}$, $TaPO_5$, $LiZr_2(PO_4)_3$, $Li_3PO_4$ |
| Example 22 | dopant | $Li_{1.25}Zr_{0.25}Ta_{1.75}PO_8$ | 30.6 | $Ta_9PO_{25}$, $TaPO_5$, $LiZr_2(PO_4)_3$, $Li_3PO_4$ |
| Example 23 | | $Li_{1.375}Zr_{0.375}Ta_{1.625}PO_8$ | 36.7 | $Ta_9PO_{25}$, $LiZr_2(PO_4)_3$, $Li_3PO_4$ $ZrO_2$ |
| Example 24 | F dopant | $Li_{0.875}Ta_2PO_{7.875}F_{0.125}$ | 19.5 | $Ta_9PO_{25}$, $TaPO_5$, $Li_3PO_4$ LiF |
| Example 25 | | $Li_{0.75}Ta_2PO_{7.75}F_{0.25}$ | 21.5 | $Ta_9PO_{25}$, $TaPO_5$, $Li_3PO_4$, LiF |
| Example 26 | | $Li_{0.625}Ta_2PO_{7.625}F_{0.375}$ | 22.1 | $Ta_9PO_{25}$, $TaPO_5$, $Li_3PO_4$, LiF |
| Example 27 | | $Li_{0.5}Ta_2PO_{7.5}F_{0.5}$ | 22.0 | $Ta_9PO_{25}$, $TaPO_5$, LiF |
| Example 28 | | $Li_{0.375}Ta_2PO_{7.375}F_{0.625}$ | 18.5 | $Ta_9PO_{25}$, $TaPO_5$, $Li_2Ta_2O_3F_6$, LiF |
| Example 29 | | $Li_{0.25}Ta_2PO_{7.25}F_{0.75}$ | 17.8 | $Ta_9PO_{25}$, $TaPO_5$, $Li_2Ta_2O_3F_6$ |
| Comparative Example 2 | Hf, F co-doped | $LiHfTaPO_7F$ | 43.8 | $TaPO_5$, LiF, $HfO_2$ |
| Comparative Example 4 | | $LiHf_2PO_6F_2$ | 44.7 | $Hf_2P_2O_9$, $HfF_4$, LiF, $HfO_2$ |

Evaluation Example 8: Impedance and Activation Energy of Bulk and Total Ionic Conductivity The ionic conductivity was measured at 50 mV in a frequency range of 5 MHz to 1 Hz according to the Ac EIS at a temperature of 21° C. The activation energy was determined by using impedance at variable temperatures from room temperature to 120° C. in a chamber after CSZ was scavenged. The synthesized pellets were sputtered with gold as a blocking electrode (e.g., MTI-sputtering coater), and sealed with a home-built cylindrical cell for all measurements.

1) $LiTa_2PO_8$

Figure 8A:
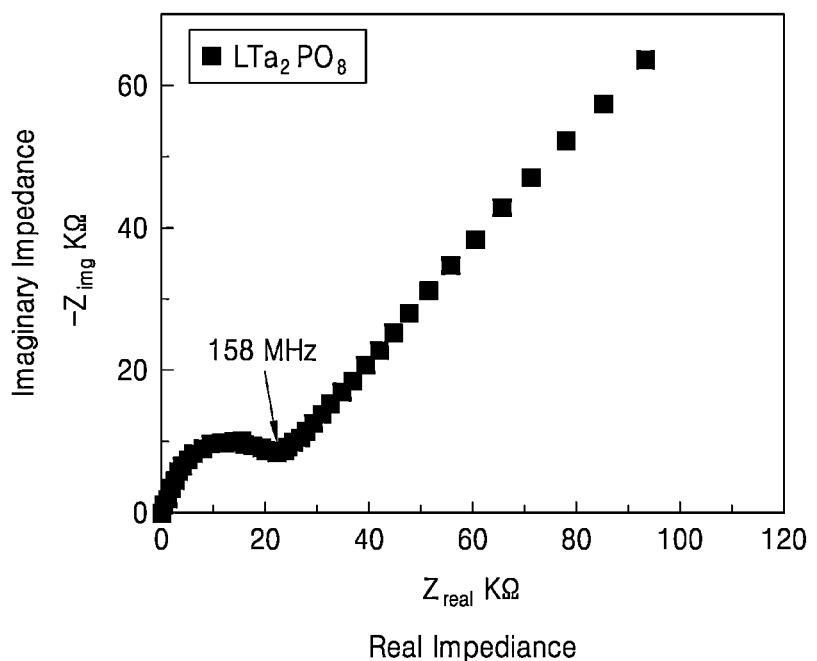
FIG. 8A is a graph of imaginary impedance ($-Z_{img}$, kilo-ohms (KΩ)) versus real impedance ($Z_{real}$, kilo-ohms, (KΩ)) that shows the results of impedance analysis of $LiTa_2PO_8$.
Figure 8B:
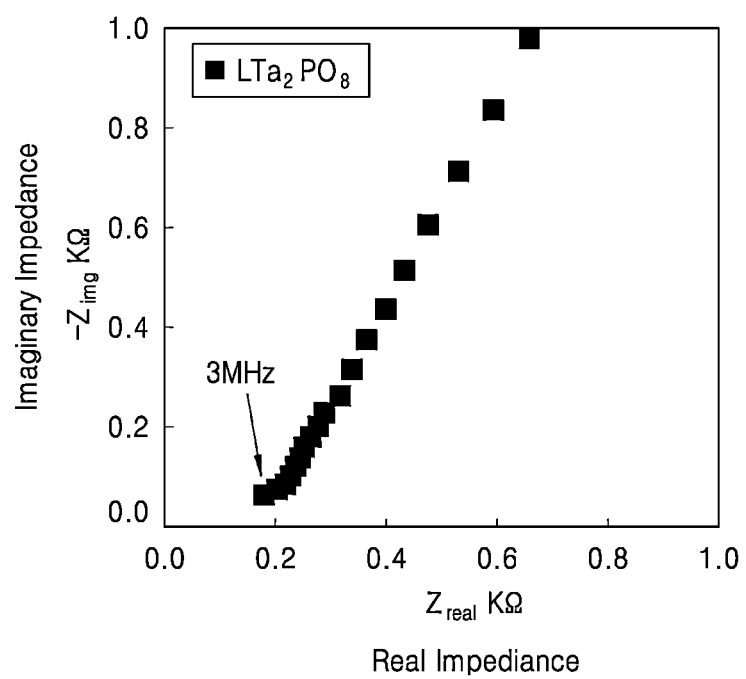
FIG. 8B shows an enlarged view of a portion of FIG. 8A.
Figure 8C:
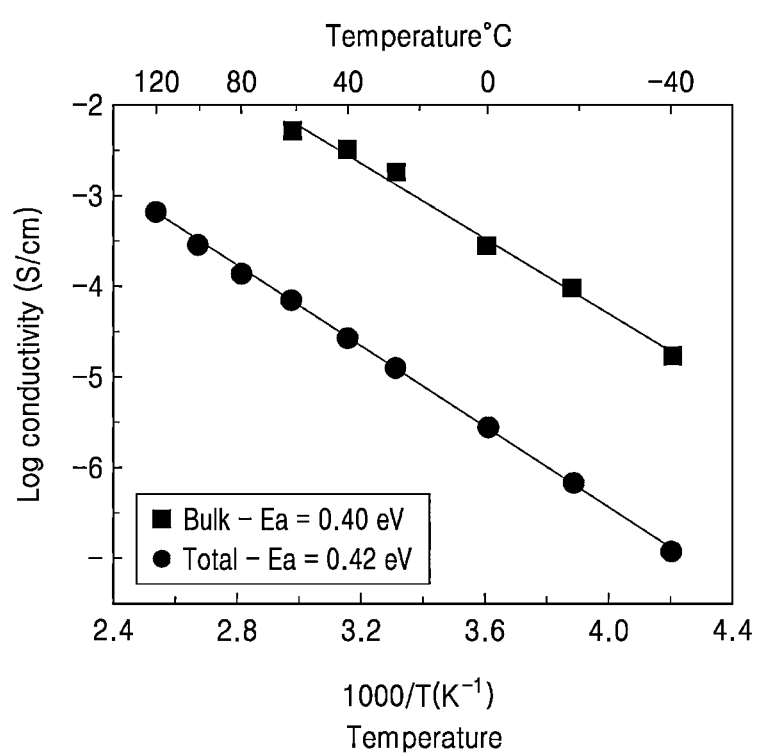
FIG. 8C is a graph of log conductivity (Siemens per centimeter (S/cm)) versus temperature (° C.) and (1000/ Kelvin (K)), which shows the results of evaluation of activation energy analysis of $LiTa_2PO_8$ based on bulk conductivity and total ionic conductivity.

The impedance spectrum is shown in FIGS. 8A and 8B, and the results of the evaluation of bulk conductivity and total ionic conductivity are shown in FIG. 8C.

Referring to FIGS. 8A and 8B, an area at a frequency of 3 MHz represents bulk impedance, and an area at a frequency of 158 MHz represents a particle boundary. In addition, as shown in FIG. 8C, the bulk impedance did not appear clearly at a temperature greater than 60° C., and thus, only the total impedance was considered.

2) Solid Conductor in which Ta was Partially Substituted with Hf

Figure 8D:
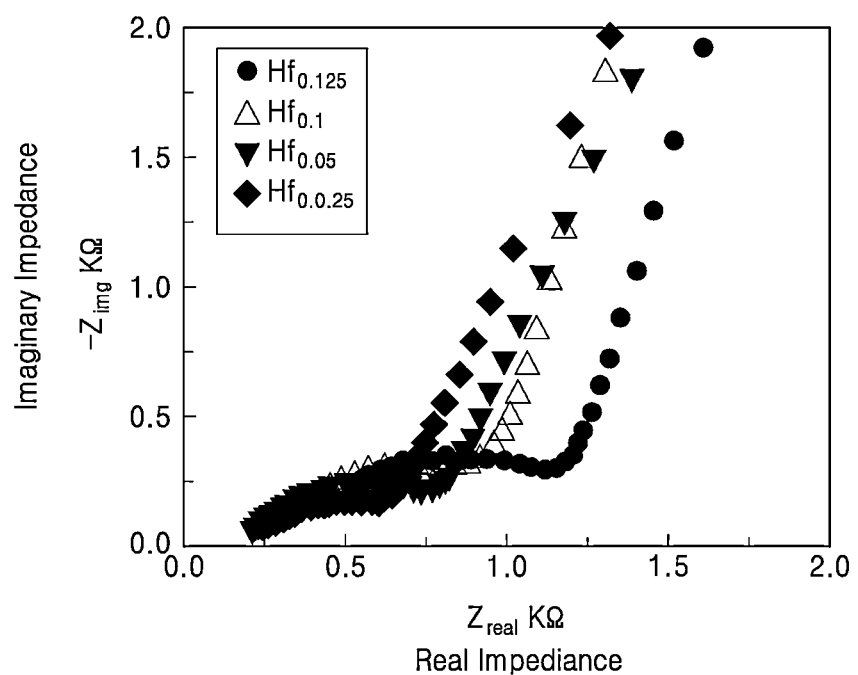
FIG. 8D is a graph of imaginary impedance ($-Z_{img}$, kilo-ohms (KΩ)) versus real impedance ($Z_{real}$, kilo-ohms (KΩ)), which shows impedance spectra of solid conductors in which tantalum is partially substituted with hafnium.

The impedance spectra of the solid conductors in which Ta was partially substituted with Hf is shown in FIG. 8D. Referring to FIG. 8D, the bulk conductivity and the grain boundary conductivity of the solid conductors were found.

Figure 8E:
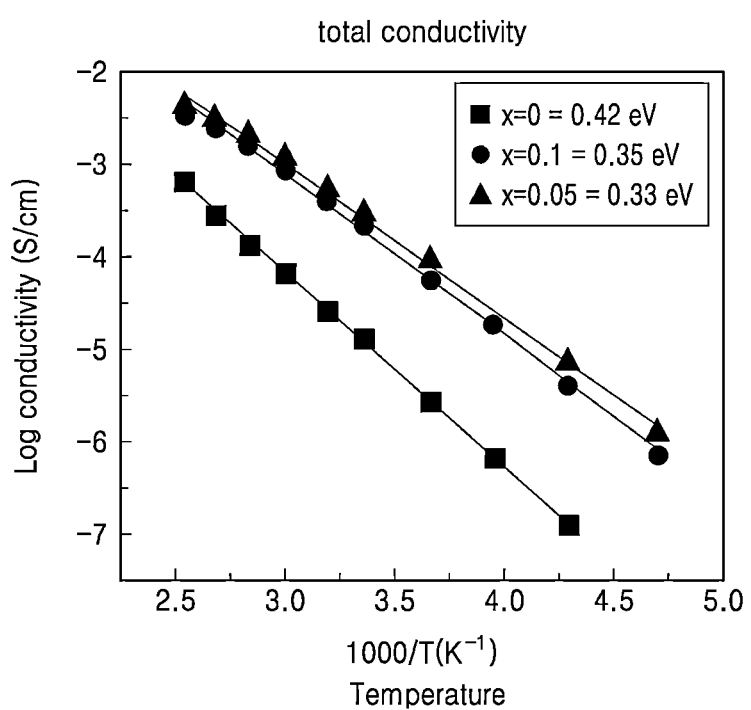
FIG. 8E is a graph of log conductivity (Siemens per centimeter (S/cm)) versus temperature (1000/Kelvin (K)), which shows the activation energy of $LiTa_2PO_8$ and solid conductors doped with hafnium.

The activation energies of the solid conductors of $LiTa_2PO_8$ and $LiTa_2PO_8$ doped with Hf are shown in FIG. 8E. The solid conductor doped with Hf shows the reduced activation energy as compared with $LiTa_2PO_8$.

The solid conductor exhibiting improved ionic conductivity at room temperature may be used as an excellent lithium ion conductor. Such a lithium ion conductor may have improved lithium stability and high oxidation potential, and thus, may be used as an electrolyte for a cathode. Accordingly, when the lithium ion conductor is used, an electrochemical device having improved performance may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid conductor comprising:
a compound represented by Formula 1, a compound represented by Formula 2, or a combination thereof $$Li_{1-z}Ta_2PO_{8-z}X_z \qquad \text{Formula 1}$$

wherein, in Formula 1,
X is a halogen, a pseudohalogen, or a combination thereof, and
0<z<1, $$Li_{1-z}Ta_2PO_8 \cdot zLiX \qquad \text{Formula 2}$$

wherein, in Formula 2,
X is a halogen, a pseudohalogen, or a combination thereof, and
0<z<1.

2. The solid conductor of claim 1, wherein X in Formula 1 and X in Formula 2 are each independently chlorine, bromine, fluorine, cyanide, cyanate, thiocyanate, azide, or a combination thereof.

3. The solid conductor of claim 1, wherein z in Formula 1 and z in Formula 2 are each independently 0<z≤0.3.

4. The solid conductor of claim 1, wherein the solid conductor has a monoclinic structure.

5. The solid conductor of claim 1, wherein the solid conductor has a peak at about 17.5° 2θ, about 24.8° 2θ, about 24.9° 2θ, about 25.4° 2θ, and about 27.8° 2θ, when analyzed by X-ray diffraction using Cu Kα radiation.

6. The solid conductor of claim 1, wherein the solid conductor has a peak at a chemical shift in a range of about −6 parts per million to about −14 parts per million, when analyzed using $^{31}$P-nuclear magnetic resonance spectroscopy.

7. The solid conductor of claim 6, wherein the peak has a full width at half-maximum in a range of about 2 parts per million to about 6 parts per million, when analyzed using $^{31}$P-nuclear magnetic resonance spectroscopy.

8. The solid conductor of claim 1, wherein the solid conductor has a peak at a chemical shift of about −15 parts per million to about −22 parts per million, when analyzed by $^{31}$P-nuclear magnetic resonance spectroscopy.

9. The solid conductor of claim 1, wherein the solid conductor has a lithium ion conductivity of $1\times10^{-2}$ milli-Siemens per centimeter or more greater at 25° C.

10. The solid conductor of claim 1, wherein the solid conductor is $Li_{0.9}Ta_2PO_{7.9}F_{0.1}$, $Li_{0.9}Ta_2PO_{7.9}Cl_{0.15}$, $Li_{0.85}Ta_2PO_{7.85}Cl_{0.15}$, $Li_{0.85}Ta_2PO_{7.85}F_{0.15}$, $Li_{0.8}Ta_2PO_{7.8}F_{0.2}$, $Li_{0.8}Ta_2PO_{7.8}Cl_{0.2}$, $Li_{0.975}Ta_2PO_{7.975}F_{0.025}$, $Li_{0.95}Ta_2PO_{7.95}Cl_{0.05}$, $Li_{0.975}Ta_2PO_{7.975}Cl_{0.025}$, $Li_{0.95}Ta_2PO_{7.95}F_{0.05}$, $Li_{0.875}Ta_2PO_{7.875}F_{0.125}$, $Li_{0.75}Ta_2PO_{7.75}F_{0.25}$, $Li_{0.625}Ta_2PO_{7.625}F_{0.375}$, $Li_{0.5}Ta_2PO_{7.5}F_{0.5}$, $Li_{0.375}Ta_2PO_{7.375}F_{0.625}$, $Li_{0.25}Ta_2PO_{7.25}F_{0.75}$, or a combination thereof.

11. A method of manufacturing a solid conductor, the method comprising:
preparing a precursor mixture comprising a precursor for forming a solid conductor; and
heat-treating the precursor mixture in an oxidizing gas to manufacture a solid conductor represented by Formula 1, Formula 2, or a combination thereof, $$Li_{1-z}Ta_2PO_{8-z}X_z \quad \text{Formula 1}$$

wherein, in Formula 1,
X is a halogen, a pseudohalogen, or a combination thereof, and
$0<z<1$, $$Li_{1-z}Ta_2PO_8 \cdot zLiX \quad \text{Formula 2}$$

wherein, in Formula 2,
X is a halogen atom or a pseudohalogen, and
$0<z<1$.

12. The method of claim 11, wherein the heat-treating comprises heat-treating at about 500° C. to about 1,200° ° C.

13. The method of claim 12, wherein the heat-treating comprises a first heat-treatment and a second heat-treatment, wherein the second heat-treatment comprises heat-treating at a temperature greater than a temperature of the first heat-treatment, and the first heat-treatment comprises heat-treating at a temperature in a range of about 500° C. to about 1,000° C., and
the second heat-treatment comprises heat-treating at a temperature of about 600° ° C. to about 1,200° C.

14. The method of claim 11, wherein the preparing the precursor mixture further comprises adding a lithium precursor to the precursor mixture, and the preparing the precursor mixture further comprises adding a lithium precursor containing lithium chloride, lithium fluoride, or a combination thereof to the precursor mixture.

15. A solid electrolyte comprising:
the solid conductor of claim 1.

16. An electrochemical device comprising:
a cathode;
an anode; and
the solid conductor of claim 1.

17. The electrochemical device of claim 16, wherein the electrochemical device is an electrochemical battery comprising the cathode, the anode, and a solid electrolyte disposed between the cathode and the anode, the solid electrolyte comprising the solid conductor.

18. The electrochemical device of claim 17, wherein the solid electrolyte is an electrolyte protective film, a cathode protective film, an anode protective film, or a combination thereof.

19. The electrochemical device of claim 16, wherein the electrochemical device is an all-solid-state battery.

* * * * *